US011981020B2

(12) United States Patent
Goldberg et al.

(10) Patent No.: US 11,981,020 B2
(45) Date of Patent: May 14, 2024

(54) DELIVERY VEHICLES FOR EN ROUTE FOOD PRODUCT PREPARATION

(71) Applicant: Congruens Group, LLC, San Carlos, CA (US)

(72) Inventors: Joshua Gouled Goldberg, San Carlos, CA (US); Alexander John Garden, San Carlos, CA (US); Vaibhav Goel, San Carlos, CA (US); Tookie Graham, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 728 days.

(21) Appl. No.: 15/734,143

(22) PCT Filed: Jun. 3, 2019

(86) PCT No.: PCT/US2019/035101
§ 371 (c)(1),
(2) Date: Dec. 1, 2020

(87) PCT Pub. No.: WO2019/232506
PCT Pub. Date: Dec. 5, 2019

(65) Prior Publication Data
US 2021/0213618 A1     Jul. 15, 2021

Related U.S. Application Data

(60) Provisional application No. 62/779,082, filed on Dec. 13, 2018, provisional application No. 62/779,090, (Continued)

(51) Int. Cl.
*A47J 44/00* (2006.01)
*A21B 1/52* (2006.01)
(Continued)

(52) U.S. Cl.
CPC ............. *B25J 11/0045* (2013.01); *A21B 1/52* (2013.01); *A47J 36/321* (2018.08); *A47J 44/00* (2013.01);
(Continued)

(58) Field of Classification Search
CPC ...... B25J 11/0045; A47J 36/321; A47J 44/00; A47J 2201/00; A21B 1/52; B60P 3/0257;
(Continued)

(56) References Cited

U.S. PATENT DOCUMENTS 4,753,406 A * 6/1988 Kodama ................. F24C 15/30
248/327
5,285,604 A * 2/1994 Carlin ................... E04H 1/1205
52/36.2
(Continued)

OTHER PUBLICATIONS

International Search Report for International Application No. PCT/US19/35101 dated Oct. 17, 2019 (3 pages).
(Continued)

*Primary Examiner* — Avinash A Savani
(74) *Attorney, Agent, or Firm* — Goodwin Procter LLP

(57) ABSTRACT

Technologies are generally described for delivery vehicles and containers for en route food product preparation. Modular food product preparation systems that may receive food items and supplies and prepare food product(s) en route such that the food product(s) is prepared by the time the system reaches a delivery destination may include trucks, railway cars, watercraft, and similar vehicles. Food preparation process steps and timing may be determined based on travel information (e.g., delivery destination, routes, etc.), as well as, food item and food product information. An on-board controller may determine the process steps and timing(s) and control operations of robotic devices arranged modularly in a container or vehicle to execute steps of the food preparation process. Alternatively or additionally, the on-board
(Continued)

controller may receive instructions from a remote controller. Travel parameters of the vehicle may also be adjusted based on the food preparation process and/or travel information.

20 Claims, 18 Drawing Sheets

Related U.S. Application Data filed on Dec. 13, 2018, provisional application No. 62/700,115, filed on Jul. 18, 2018, provisional application No. 62/700,117, filed on Jul. 18, 2018, provisional application No. 62/679,519, filed on Jun. 1, 2018, provisional application No. 62/679,522, filed on Jun. 1, 2018.

(51) Int. Cl.
| | |
|---|---|
| *A47J 36/32* | (2006.01) |
| *B25J 11/00* | (2006.01) |
| *B60P 3/025* | (2006.01) |
| *G05B 19/4155* | (2006.01) |
| *G06Q 10/0631* | (2023.01) |
| *G06Q 10/0833* | (2023.01) |
| *G06Q 10/0835* | (2023.01) |
| *G06Q 50/12* | (2012.01) |
| *G01C 21/34* | (2006.01) |
| *G01C 21/36* | (2006.01) |

(52) U.S. Cl.
CPC ........ *B60P 3/0257* (2013.01); *G05B 19/4155* (2013.01); *G06Q 10/06316* (2013.01); *G06Q 10/0833* (2013.01); *G06Q 10/08355* (2013.01); *G06Q 50/12* (2013.01); *A47J 2201/00* (2013.01); *G01C 21/34* (2013.01); *G01C 21/3691* (2013.01); *G05B 2219/39473* (2013.01)

(58) Field of Classification Search
CPC ...... G05B 19/4155; G05B 2219/39473; G06Q 10/06313; G06Q 10/0833; G06Q 10/08355; G01C 121/34; G01C 121/3691
USPC ........................................................ 126/276
See application file for complete search history.

(56) References Cited

U.S. PATENT DOCUMENTS

| | | | | |
|---|---|---|---|---|
| 6,431,628 | B1 * | 8/2002 | Bell, Jr. ................ | B60P 3/0257 296/22 |
| 2014/0370167 | A1 * | 12/2014 | Garden .................. | G06Q 50/12 99/325 |
| 2015/0006005 | A1 * | 1/2015 | Yu .......................... | B60P 3/007 701/22 |
| 2015/0019354 | A1 * | 1/2015 | Chan ..................... | G06Q 10/109 99/325 |
| 2017/0290345 | A1 | 10/2017 | Garden et al. | |
| 2018/0127192 | A1 | 5/2018 | Cohen | |
| 2019/0049988 | A1 * | 2/2019 | Meij ..................... | G05D 1/0274 |
| 2019/0111955 | A1 * | 4/2019 | Canoso .................. | E05F 15/73 |

OTHER PUBLICATIONS

International Written Opinion for International Application No. PCT/US19/35101 dated Oct. 17, 2019 (12 pages).
PCT International Preliminary Report on Patentability in Application PCT/US2019/035101, dated Dec. 1, 2020, 10 pages.

* cited by examiner

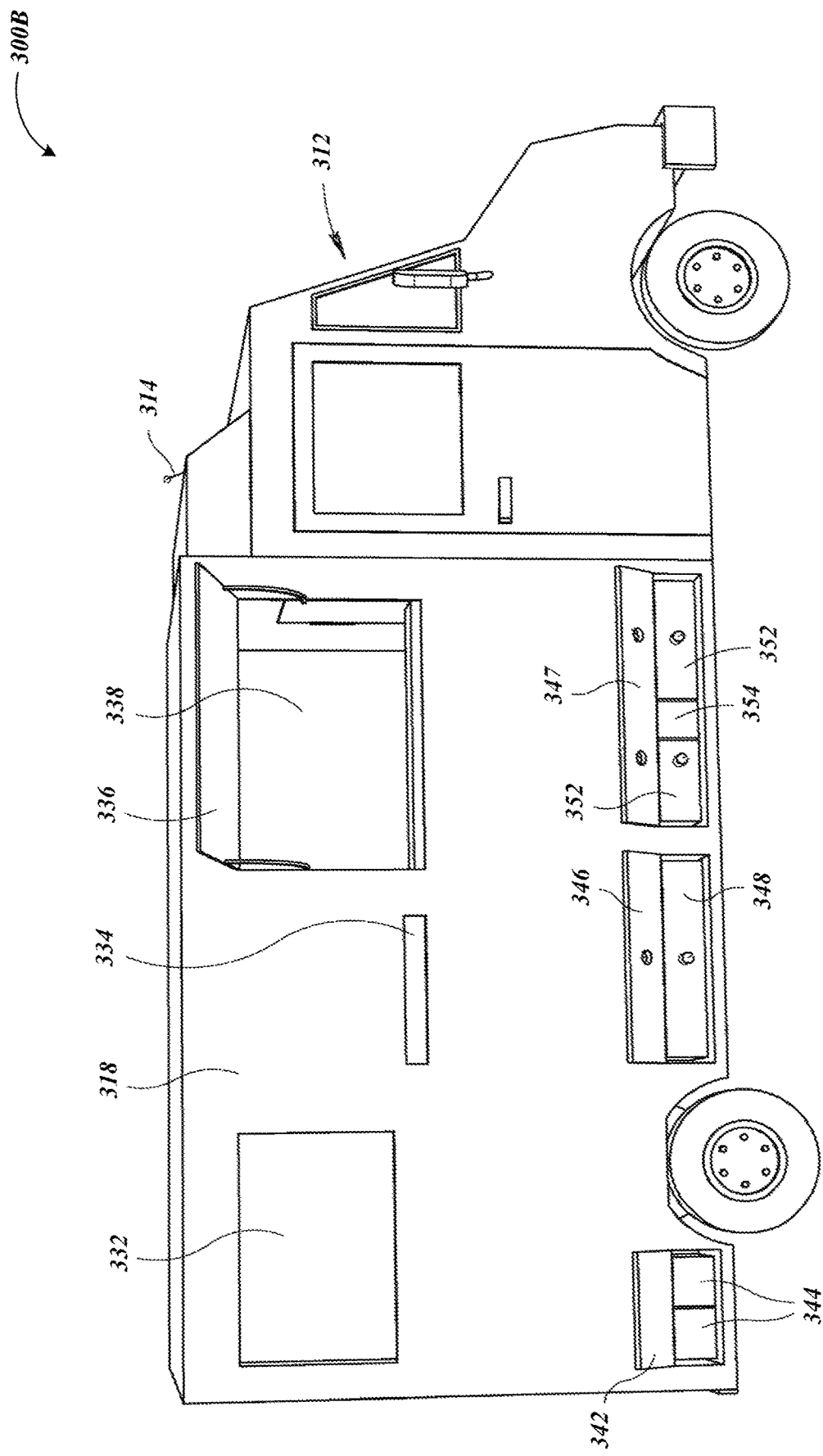

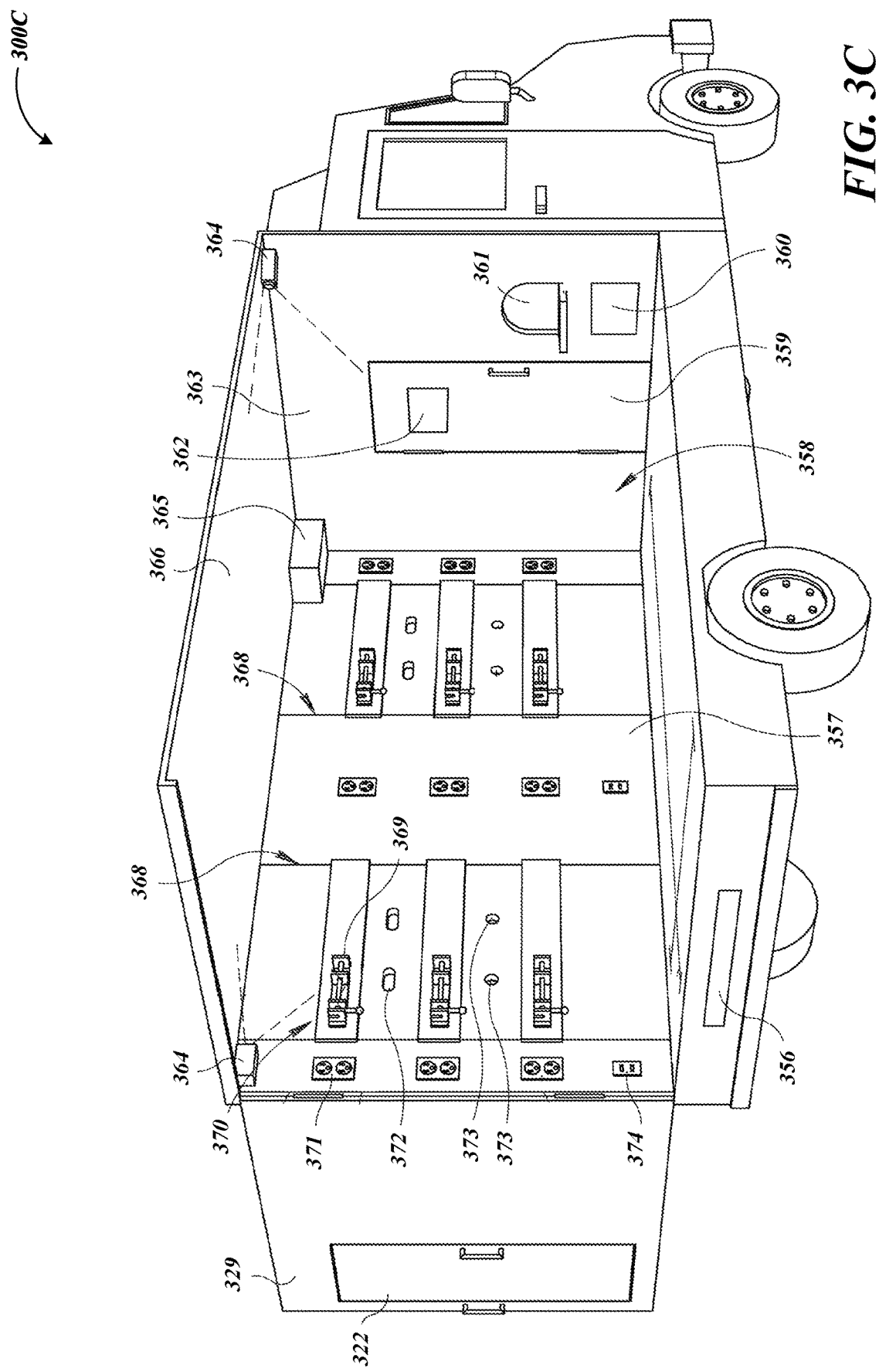

DELIVERY VEHICLES FOR EN ROUTE FOOD PRODUCT PREPARATION

CROSS-REFERENCE TO RELATED APPLICATIONS

This application is a National Stage of PCT/US2019/035101, filed Jun. 3, 2019 which claims the benefit of U.S. Provisional Patent Applications Ser. No. 62/679,519 filed on Jun. 1, 2018, Ser. No. 62/679,522 filed on Jun. 1, 2018, Ser. No. 62/700,115 filed on Jul. 18, 2018, Ser. No. 62/700,117 filed on Jul. 18, 2018, Ser. No. 62/779,082 filed on Dec. 13, 2018, and Ser. No. 62/779,090 filed on Dec. 13, 2018. The disclosures of the above-listed provisional applications are hereby incorporated by reference for all purposes.

BACKGROUND

Unless otherwise indicated herein, the materials described in this section are not prior art to the claims in this application and are not admitted to be prior art by inclusion in this section.

Conventional food supply chains often include a source or initial supplier of raw ingredients for food products for human consumption, such as plant-based or animal-based ingredients. The ingredients are often transported from the source to one or more processing facilities, where the raw ingredients are prepared into food products including one or more intermediate ingredients and eventually prepared into marketable food products intended for direct human consumption. The food products are then often transported from the processing facilities to locations where consumers can select and/or consume the food products, such as homes, grocery stores, restaurants, etc.

SUMMARY

The present disclosure generally describes delivery vehicles and containers for en route food product preparation.

According to some examples, a modular system for en route food product preparation is described. The method may include a container configured to provide a sterile environment for preparation of food items en route to a delivery destination; one or more intake ports on the container configured to receive the food items and supplies; one or more delivery ports on the container configured to provide prepared food product; one or more re-configurable anchor systems in the container configured to anchor one or more food preparation equipment; and one or more re-configurable supply ports in the container configured to supply the one or more food preparation equipment. The modular system may also include an on-board controller configured to determine travel information, food items information, and food product information associated with the food product to be prepared and delivered; determine one or more steps and a timing for a process to prepare the food product based on the travel information, the food items information, and the food product information; and control robotic devices of the one or more food preparation equipment to autonomously execute the process such that the food product is prepared when the modular system reaches the delivery destination.

According to other examples, a vehicle to prepare food items en route is described. The vehicle may include a container configured to provide a re-configurable, sterile environment for one or more food preparation and storage equipment with robotic devices to autonomously prepare food items en route to a delivery destination; a communication system configured to enable wired or wireless communications with a remote controller system; and an on-board controller communicatively coupled to the communication system and robotic devices on each of the one or more food preparation and storage equipment. The on-board controller may be configured to receive instructions from the remote controller system associated with one or more steps and a timing for a process to prepare the food items based on travel information, food items information, and food product information collected by the remote controller system for the vehicle; and control operations of the robotic devices to autonomously execute the process en route based on the received instructions.

According to further examples, a food delivery truck to prepare food items en route is described. The food delivery truck may include a cab portion to control travel operations; a cargo portion configured to provide a re-configurable, sterile environment for one or more food preparation and storage equipment with robotic devices to autonomously prepare food items en route to a delivery destination; a communication system configured to enable wireless communications with one or more remote devices; and an on-board controller communicatively coupled to the communication system and robotic devices on each of the one or more food preparation and storage equipment. The on-board controller may be configured to determine travel information, food items information, and food product information associated with a food product to be prepared and delivered; determine one or more steps and a timing for a process to prepare the food product based on the travel information, the food items information, and the food product information; and control robotic devices of the one or more food preparation and storage equipment to autonomously execute the process such that the food product is prepared when the food delivery truck reaches the delivery destination.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3B includes an isometric exterior view of another example truck equipped with food distribution equipment and appliances for en route food product preparation;

FIG. 3C includes an isometric exterior view of an example truck with a right-hand interior side wall cut away showing a rack mounting configuration to install equipment for en route food product preparation;

DETAILED DESCRIPTION

Figure 1:
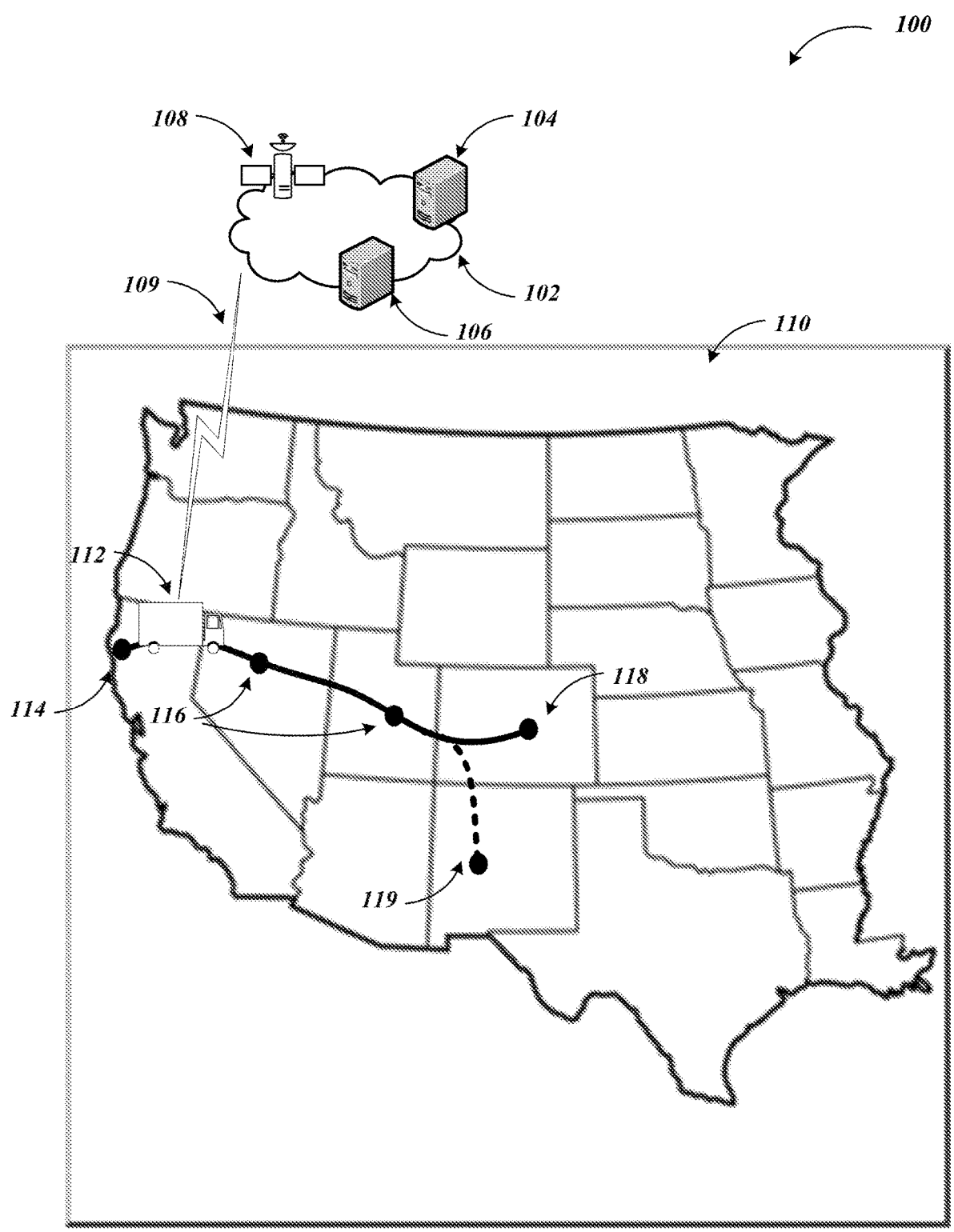
FIG. 1 includes a conceptual illustration of an example truck based en route food product preparation system over a map of Western United States.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to apparatus, systems, and/or devices related to delivery vehicles and containers for en route food product preparation.

Briefly stated, technologies are generally described for delivery vehicles and containers for en route food product preparation. Modular food product preparation systems that may receive food items and supplies and prepare food product(s) en route such that the food product(s) is prepared by the time the system reaches a delivery destination may include trucks, railway cars, watercraft, and similar vehicles. Food preparation process steps and timing may be determined based on travel information (e.g., delivery destination, routes, etc.), as well as, food item and food product information. An on-board controller may determine the process steps and timing(s) and control operations of robotic devices arranged modularly in a container or vehicle to execute steps of the food preparation process. Alternatively or additionally, the on-board controller may receive instructions from a remote controller. Travel parameters of the vehicle may also be adjusted based on the food preparation process and/or travel information.

FIG. 1 includes a conceptual illustration of an example truck based en route food product preparation system over a map of Western United States, arranged in accordance with at least some embodiments described herein.

Food product delivery may be long distance such as interstate but may also be short-distance such as between two cities, within a city or a neighborhood. On the other hand, long-distance food product delivery may be even international or intercontinental and may implement one or more different delivery vehicles of which all or only a portion may prepare food product. Depending on the type of delivery distance, the delivery vehicle may be a small truck, a semi-truck, a train, a watercraft, or a container arranged to fit in any one or more of the listed vehicles. Diagram 100 shows an example interstate delivery route on a map 110 with starting station 114, intermediary waypoints 116, and final delivery destination 118.

According to some embodiments, the delivery truck 112 may be equipped with modular food preparation equipment that include robotic devices such that food items can be prepared autonomously into one or more food products while the delivery truck 112 is en route. An on-board controller may manage operations of the robotic devices to prepare the food items according to timing requirements of the travel route. In some examples, the on-board controller may receive travel information, food item information, and/or food product information from a remote computing device such as a server 106. Travel information may include any one or more of one or more delivery destinations, one or more potential routes between delivery destinations, road condition information for the potential routes, traffic condition information for the potential routes, licensing information, vehicle information, and/or weather condition information for the potential routes. The food items information may include source information, quantity information, quality information, and/or type information associated with ingredients for the food product to be prepared. The food product information may include quantity information, quality information, type information, and/or packaging information associated with the food product to be prepared.

The on-board controller may communicate 109 with the server 106 and/or with other resources such as a global positioning system server via wired media such as a wired network or direct-wired connection, or wireless media such as acoustic, radio frequency (RF), microwave, infrared (IR) and other wireless media (e.g., terrestrial based or satellite based). In some cases, a backend system including a number of servers (e.g., server 104) and other general purpose of special purpose devices (e.g., satellite 108) communicating over a network 102 may collect the travel information, food item information, and/or food product information, and provide travel and/or food preparation/processing instructions to the on-board controller. In other cases, the on-board controller may receive part or all of the information and generate the instructions itself.

In some examples, food items or ingredients for the food products may be received by the delivery truck 112 may be received all at the starting station 114 or at various intermediary waypoints 116, Similarly, prepared food products may be delivered all to the final delivery destination 118 or at some of the intermediary waypoints 116 as well. In other examples, updated traffic information or delivery instructions may be received while en route. For example, the truck may be instructed to deliver the prepared food products to a new delivery destination 119. Upon receiving the updated information, food preparation steps and their timing may be adjusted to ensure the food product(s) is properly prepared timely for arrival at the delivery destination.

In some implementations, the delivery truck 112 may be completely autonomous, capable of moving from one location to another under its own control or the control of a remote processor-based system without user input or user control. Alternatively, the delivery truck 112 may be semi-autonomous, capable of moving from one location to another under its own control or the control of a remote processor-based system. For example, the delivery truck 112 may be capable of moving from one location to another under with a minimal amount of user input or minimal amount of user control.

The size and shape of the delivery truck 112 may depend at least in part on licensing requirements of the locality, the street layout, and/or the surrounding environment of the locality in which the delivery truck 112 is intended to operate. For example, small, tight city streets may require a delivery vehicle that is comparatively shorter and/or narrower than a delivery vehicle that can safely and conveniently navigate larger, suburban thoroughfares.

Figure 2:
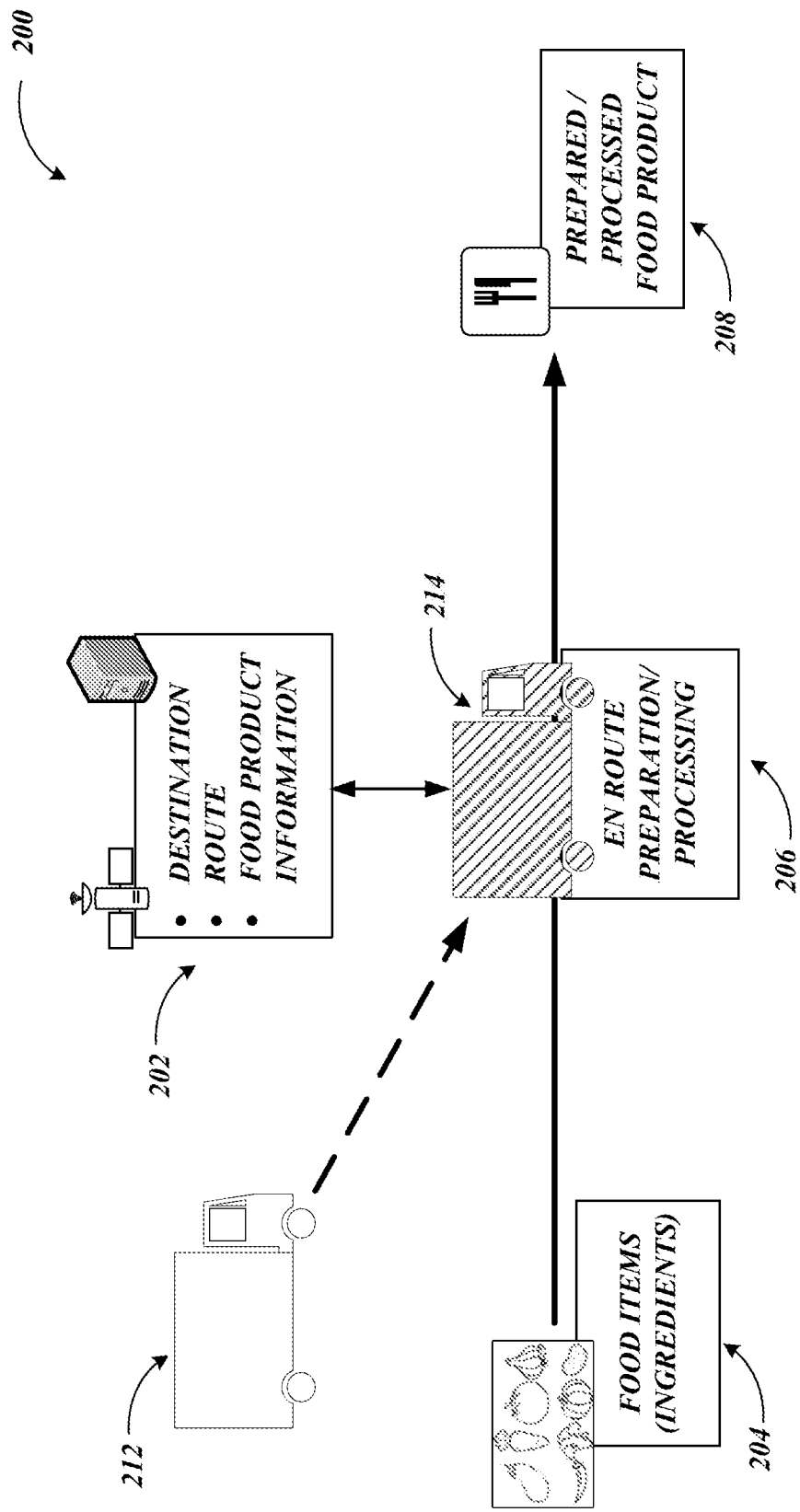
FIG. 2 includes a high-level block diagram for an example en route food product preparation system employing delivery vehicles or containers.

FIG. 2 includes a high-level block diagram for an example en route food product preparation system, arranged in accordance with at least some embodiments described herein.

As shown in diagram 200, a delivery vehicle 214 equipped for en route preparation may receive food items 204 (raw materials, ingredients, and similar items to be processed) and deliver prepared and/or processed food product 208 to a delivery destination. En route preparation 206 may include a multi-step process, where operational parameters (e.g., temperature for heating or cooling a food item, water pressure for washing a food item, slicing or blending speeds, etc.) and timing of each step may be determined and/or adjusted based on travel route parameters such as road conditions, weather conditions, traffic congestion, expected arrival time, etc. Weather conditions may include one or more temperature, humidity, altitude, winds, wave size, etc. Road conditions may include one or more of road curvatures, road tilt (or expected vehicle tilt), construction, road roughness, etc.

A control system 202 may receive information associated with the food items (their quantity, quality, type, etc.), food product (quantity, quality, type, packaging, etc.), and/or travel information. The control system may determine operational parameters of the process steps and their timing based on the received information and instruct an autonomous food product preparation system in the delivery vehicle 214 to perform the steps of the process based on the operational parameters and timing. The control system 202 may also send instructions for travel to the delivery vehicle (autonomous driving or for vehicle driver).

The autonomous food product preparation system in the delivery vehicle 214 may include one or more food preparation and storage equipment arranged in one or more sealable container modules configured to feed each other. The delivery vehicle 214 may include a truck, a railway car, and/or a watercraft or any other suitable vehicle. Alternatively, the autonomous food product preparation system may be installed in a container, which may be affixable to and transportable by one or more vehicles. In some cases, updated travel information such as addition of a new intermediate waypoint, elimination of an existing intermediate waypoint, change of the delivery destination, change of vehicle type or status, or selection of a different route may be received while en route. In response, operational parameters and timing of the steps of the process for food product preparation may be adjusted such that the food product is in a desired preparation state when the vehicle arrives at the destination.

In some implementations, the delivery vehicle 214 may be a customized generic vehicle 212. For example, a generic shipping container may be customized to create a container capable of providing an environment for en route preparation of food products. The container may then be loaded onto or integrated into a vehicle such as a truck, a semi-truck, a railway car, or a watercraft. In another example, a cargo area of a truck, a semi-truck, a railway car, or a watercraft may be customized to provide an environment for en route preparation of food products. The customization may include, but is not limited to, one or more intake ports to receive the food items and supplies, where a size or a position of the one or more intake ports may be re-configurable based on a type of the food items and supplies to be received. The customization may also include one or more delivery ports to provide a prepared food product, where a size or a position of the one or more delivery ports may be re-configurable based on a type of the food product to be delivered. The customization may further include one or more re-configurable anchor systems to anchor one or more food preparation and storage equipment, where the one or more re-configurable anchor systems may include a plurality of unitary anchor points or a plurality of separated anchor points along one or more interior walls, frames, or rails within the container/vehicle. The customization may also include one or more re-configurable supply ports to supply the one or more food preparation and storage equipment, display devices on exterior walls to display advertising, branding information, or images of food preparation process from inside the vehicle.

In an example scenario, a pizza delivery truck may receive ingredients at a food processing plant and receive instructions to deliver different types and amounts of pizza to a number of destinations. A control system may determine possible travel routes for the delivery truck and suggest a selected route. The route may be selected based on fastest arrival or based on time needed to complete preparation (which may include preparation of the pizza product, par-baking the pizza food product and/or fully baked pizza food product) of the pizzas. An order of delivery destinations may also be selected based on requested delivery time or based on preparation times needed for the different pizzas. For example, a delivery destination that requested pizzas with longest preparation time may be placed as the last destination, whereas a delivery destination that requested only cheese pizzas may be selected as the first destination.

Operational parameters and timing such as temperature of the pizza oven and baking time may be adjusted based on changing traffic conditions.

In another example scenario, a cargo container may be fitted with sauce preparation equipment in a modular fashion. Tomatoes and other ingredients (e.g., garlic, onion, salt, pepper, sugar, basil, olive oil, etc., any of which may be in its raw ingredient state or partially prepared as an intermediate ingredient) may be loaded into a container, which may be on a railway car. As the train leaves the farm, the control system may determine the travel time to a destination station, where finished and packaged sauces are expected to be delivered to shops. The control system may instruct modular preparation equipment to wash, sterilize, skin, and crush the tomatoes, which are then blended with other ingredients, cooked, cooled, and packaged. Each module may perform its assigned step of the process and provide its output to the next module. For example, process steps of the food preparation may be accomplished while the vehicle is in motion, and the process steps may be modified or adjusted dynamically by the control system based on the travel information. For example, the process step may be paused based on travel information, such as waiting at a way point, high winds on the route, estimated or determined vehicle conditions exceeding operational parameters (e.g., high winds, vehicle tilt, or road roughness creating vehicle or equipment vibrations or state exceeding safety or operational standards, etc.). If a process step (including food item transfer) is paused, the control system may adjust the equipment processing parameters (equipment speed, temperature, etc.) of that processing step when resumed and/or one or more following process steps, may select a different route to a destination to improve the estimated vehicle conditions (avoid weather or road conditions, etc.), or use/adjust any other process step or vehicle or travel information as appropriate to ensure the food product is properly prepared when the vehicle reaches its destination.

Additionally or alternatively, operating conditions of the process step and/or food preparation equipment may be adjusted based upon the travel information and/or determined operating conditions of the vehicle. For example, the equipment parameters may be decreased, e.g., speed lowered, based upon determined (estimated or measured) travel information or vehicle parameters such as high vehicle sway or vibration. Similarly, process parameters including temperature, process (e.g., rising or cooking) time and or even ingredients may be adjusted based upon a determined environmental change of the travel information (e.g., altitude, temperature, humidity, etc.) change which may require different preparation parameters or even process. In some cases, equipment operational parameters may be dynamically adjusted based on determined (expected, predicted or measured) container or vehicle parameters based on travel information. For example, equipment may be placed in a closed operation status if vehicle parameters exceed some operational requirements (temperature, to reduce spillage, spoilage, equipment malfunction, etc.). In some cases, the selected food preparation equipment may be changed based on determined (expected, predicted or measured) container or vehicle parameters and travel information. For example, a closed system food preparation equipment (e.g., auger, agitator, plunger etc.) may be selected or adjusted for a processing step based on the travel information, as opposed to an open system food preparation equipment like a conveyor, mixer, etc. In some cases, the control system may pause food preparation at a waypoint stop or may increase food preparation or transfer at a waypoint stop (e.g., when the vehicle is being weighed at a weigh station, when the vehicle is being charged/fueled, or at an operator rest stop, etc.). In some cases, if the container temperature is too hot, equipment operations may be paused or adjusted to meet process requirements.

Additionally or alternatively, the control system may match certain processing steps with certain portions of the route and/or select different travel information based upon the determined effect of the travel information on one or more of the process steps. The control system may monitor progress of the sauce preparation process and adjust timings according to the train's progress along the route such that all sauce is finished and packaged by the time the train reaches its destination. The container may also be loaded to a semi-truck or ship for continued or new travel route and continued processing. In some cases, the control system may compare measured preparation information with expected or estimated preparation information for that particular food preparation process step and adjust process and/or food preparation equipment properties directly (add/remove heat, add oxygen,) and/or adjust preparation process.

Figure 3A:
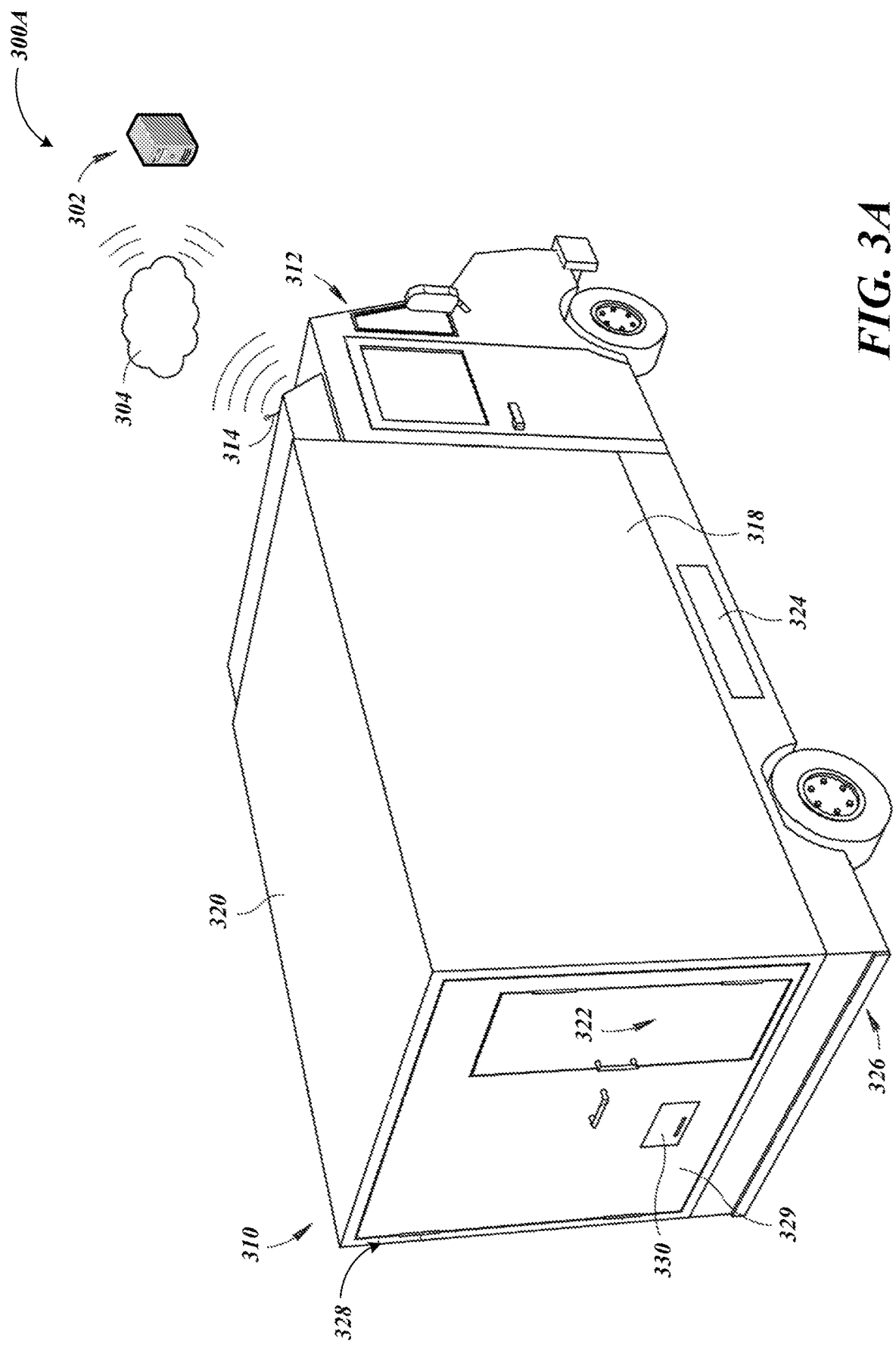
FIG. 3A includes an isometric exterior view of an example truck with equipment for en route food product preparation.

FIG. 3A includes an isometric exterior view of an example truck with equipment for en route food product preparation, arranged in accordance with at least some embodiments described herein.

Diagram 300A shows an exterior view of a delivery truck that includes a cab portion 312 and a cargo portion 310, according to at least one illustrated implementation. The delivery truck may further include a wireless communications interface, such as one or more antennas 314 coupled to an internally installed transceiver. The one or more antennas 314 may, for example, be located on or above the roof of the cab portion 312. The antenna(s) 314 may be communicatively coupled to enable communication between components on the delivery truck and a remote control system 302 located remotely from the delivery truck via a communications network 304. The cargo portion 310 may include a top side 320, a left exterior side wall (not shown) and a right exterior side wall 318 (collectively exterior side walls 318), a back wall 328, and a bottom side 326. The dimensions (width, length, and height) of the cargo portion 310 may be based on local or state ordinances regarding delivery, such as, for example, local or state ordinances governing food delivery vehicles, as well as, delivery environment needs (size of streets, parking spaces), delivered/processed food products, etc.

The back wall 328 may include one or more loading doors 329 that are sized and dimensioned to provide access to a cargo area enclosed within the cargo portion 310 of the delivery truck. In some implementations, the loading door(s) 329 may be a single door that stretches substantially across (i.e., >50%) the width of the back wall 328. In such an implementation, the loading door 329 may include a single set of hinges that may physically and rotationally couple the loading door 329 to the vehicle, or the loading door 329 may comprise multiple doors, such as a set of double doors, that together stretch substantially across (i.e., >50%) the width of the back wall 328. The back wall 328 may also include a personnel door 322 located within the loading door 329. The personnel door 322 may be physically, rotationally coupled to the loading door 329 by a set of one or more hinges. The personnel door 322 may rotate in the same direction or in the opposite direction as the loading door 329 in which the personnel door 322 is located. The dimensions, e.g., width and height, of the personnel door 322 are smaller than the corresponding dimensions of the loading door 329, for example (<33%) of the width along the back wall 328. The personnel door 322 may be set within the loading door 329 relatively closer to one or the other exterior side walls 318, or the personnel door 322 may be centered within the loading door 329 relative to the exterior side walls 318. In some implementations, the loading door 329 may include one or more additional small doors 330 that may be smaller than the personnel door 322. The small doors 330 may enable food products to be passed from the cargo portion to a person or customer standing outside of the vehicle.

In some scenarios, an exterior surface of one or both of the side walls 318 may be used to attach a static image, a display monitor, or an electronic paper for informational, advertising, or branding purposes. In case of display monitor or electronic paper, displayed information may be location-based, that is, it may change depending on the location of the delivery vehicle, food product being delivered, etc. Displayed information may be pre-loaded to an on-board controller or dynamically changed by the remote controller.

In some examples, the static image, the display monitor, or the electronic paper may be arranged to cover a majority or substantially all of the exterior side walls and the remaining surfaces of the delivery truck may be generic. That way, by changing the displayed information, a brand identity presented by the delivery truck may be completely changed with minimal effort and time. For example, the delivery truck may be configured to reflect the brand and products of a first business (e.g., a bakery) in the morning. Then, in the afternoon, the brand and products presented on the static image, the display monitor, or the electronic paper may be modified to represent a second business (e.g., a pizza delivery company).

The cargo portion 310 may be fitted with food preparation equipment to allow preparation and food items manually, semi-autonomously, or fully autonomously while the delivery truck is en route. One or both of the exterior side walls 318 may include one or more food slots that may be used to deliver a hot, prepared food item, for example a pizza, that has been packaged for delivery. The size, dimension, and position of the food slots may be based, for example, on the type of food item that is to be prepared and delivered.

In some example embodiments, the delivery truck may be used as a delivery hub. For example, the delivery truck may pick up ingredients (food items) at a source and drive to a central location for expected deliveries (e.g., a parking lot, a business, etc.). The food items may be prepared into finished food products (and packaged) ready for delivery by the time the delivery truck arrives at its destination. Once the delivery truck is parked (or in some cases, still en route), completed and packaged food products may be provided to human delivery people, airborne or ground-based drones for delivery to end destinations (e.g., homes, businesses, schools, hospitals, etc.). The delivery drones may be manually controlled by a human who is located locally or remotely from the delivery robot, and/or controlled autonomously, for example using location input or coordinate from an on-board GPS or GLONASS positioning system and receiver for from one or more wireless service provider cellular towers. In some implementations, location input and/or positioning may be provided using on-board telemetry to determine position, vision systems coupled with pre-recorded photos of the surrounding environment, peer-to-peer relative positioning with other autonomous or non-autonomous vehicles, and/or triangulation with signals from other autonomous or non-autonomous vehicles. In some implementations involving multiple delivery drones, the delivery drones may make deliveries during overlapping time periods.

FIG. 3B includes an isometric exterior view of another example truck equipped with food distribution equipment and appliances for en route food product preparation, arranged in accordance with at least some embodiments described herein.

Diagram 300B shows the delivery truck of FIG. 3A with a different configuration, where side wall 318 may include display monitor 332, service window 338, delivery slot 334, and different size ports with access covers 342, 346, and 347. Service window 338 may include an access cover 336 and be used for receiving customer orders, providing food product to customers or delivery people/drones. Delivery slot 334 may be used in a similar way. The service window 338 may be sized, dimensioned, and located to facilitate transactions between customers and operators of the delivery truck and/or drones thereof. The location of the service window 338 may be modified based upon the layout of equipment within the cargo area. In some implementations, the access cover 336 of the service window 338 may be rotated upwards and outwards to form a canopy over the service window 338. In some implementations, an additional canopy may be attached to the exterior side wall 318 above the service window 338 (or at other locations) and extended when the delivery truck is parked. The service window 338 may be aligned with a counter and/or payment system (cash register, card reader, point-of-sale (POS) terminal, etc.) that may be controlled by an operator of the delivery truck. A POS terminal may include a wireless access point, which allows orders to be placed and paid for by a customer via a mobile device (e.g., smartphone, tablet computer). This may allow of customer to place and pay for an order before arriving at the delivery truck, so freshly prepared food is ready on the customer's arrival. This may also allow the customer to pick up an order with minimal or even no human interaction with a server, cook or other human. The service window 338 may be conveniently located at or close to the end of a food preparation assembly line or area at which hot, prepared food may be placed to be sold or conveyed to customers. In some implementations, a customer may place an order using a kiosk or point of sale terminal that may be accessible by the customer. Such a kiosk or terminal may be physically attached to the vehicle or a part thereof. Alternatively, the kiosk or terminal may be detached and spaced from the vehicle, such as a kiosk or terminal that is wirelessly coupled to the vehicle for processing of the customer order.

Display monitor 332 may provide images of the interior of the cargo area during food preparation operations, a menu, brand information, and/or advertisements. A size and location of the delivery slot 334 may be selected based on delivered food product. For example, a delivery slot for pizza may be wider and shorter in height than a delivery slot used for prepared and packaged hamburgers. The delivery slot 334 may be used to deliver food items automatically (e.g., to drones) after the food item has been prepared within the cargo area.

The access covers 342, 346, and 347 may cover one or more compartments of the cargo portion and selectively, removably and/or rotationally couple to one of the exterior side walls 318 of the delivery truck to selectively provide access to respective compartments. Each access cover may be sized and dimensioned to completely cover the corresponding compartment. Each access cover may be physically coupled to the exterior side wall 318 of the cargo portion via one or more of hinges, hooks, fasteners, locks, locking devices, latches, or other devices or mechanisms that may be used to secure a panel to wall or other vertical surface to cover an aperture. The compartments 344, 348, 352, and 354 may be used to store various tanks of liquids or gases that may be used to prepare and serve food items. For example, the compartments 344, 348, 352, and 354 may store a potable water tank that carries potable water, a waste fluid tank that carries waste fluids, and a pressurized gas tank that may hold a supply of pressurized gas (e.g., air, nitrogen, carbon dioxide). Various types and sizes of ports (e.g., couplers) may be provided for access to the supply containers (tanks) to replenish the supplies or empty the tanks through active or passive systems.

One or more of the compartments may be used to house a power supply, for example a battery, electrical power generator, or other energy storage/generation component. The power supply may provide power to the systems in the delivery truck in general, as well as to the devices, robots, and other electrical equipment used to prepare food during food preparation operations. The power supply(ies) may be electrically coupled to one or more electrical power busses that may provide power to the cargo portion at one or more voltages. The power supplies may include one or more of: a battery or set of batteries, a gas generator, a propone generator, a chemical battery cell(s), an ultra-capacitor cell (s), or some other form of power supply. In some implementations, for example, the power supplies may include at least two different power supplies (e.g., a power generator and power storage) that provide at least two separate voltages to the vehicle. In some implementations, an access cover may enable fuel supply tanks, such as propone tanks, to be coupled to the appropriate power generator when food is being prepared within the cargo portion of the delivery truck.

FIG. 3C includes an isometric exterior view of an example truck with a right-hand interior side wall cut away showing a rack mounting configuration to install equipment for en route food product preparation, arranged in accordance with at least some embodiments described herein.

Diagram 300C shows an inside configuration of the delivery truck of FIG. 3A with customizations to accommodate autonomous food preparation equipment. The cargo area 358 includes a floor, a ceiling 366, a pair of interior side walls, a rear wall 363, and a loading door 329, which together delineate the cargo area 358. The loading door 329 may be rotationally coupled to one or both of the interior side walls of the cargo area 358 and may provide access into the cargo area 358 from the exterior of the vehicle. The loading door 329 may be sized and dimensioned to enable the loading of equipment and supplies into and the unloading of equipment and supplies from the cargo area. The loading door 329 may include a personnel door 322 that may be sized and dimensioned to selectively provide access to the cargo area 358 to receive a human therethrough. The personnel door 322 may be smaller in dimension (e.g., width) than the dimensions of the loading door 329.

The rear wall 363 of the cargo area 358 may include a door 359 or other opening that is sized and dimensioned to provide access to a human between the cab portion and the cargo area of the vehicle. In some implementations, a smaller cargo door 361 may be incorporated into the rear wall 363 of the cargo area 358 to enable items to be passed from the cab portion to the cargo area. The door 359 may include an observation window 362. Other openings such as port 360 may also be incorporated into the rear wall 363 or other walls. The interior walls may comprise or consist of aluminum, stainless steel, or other lightweight, hard, durable material which can be easily cleaned or sanitized. In some implementations, the interior walls may comprise food safe materials that may be used in a food preparation or serving environment. The interior side walls may be spaced relatively apart from each other to provide space for food preparation and storage equipment to be secured within the cargo area 358. The interior side walls, as described above, may include one or more ports through which prepared food products may be provided or food items and supplies may be received.

One or both of the interior side walls may include a plurality of anchor tracks or rails 368, which may be installed directly on the interior side walls or on panels 357 attached to the interior side walls and extend from the floor to the ceiling. The anchor tracks or rails 368 may be evenly spaced along the interior side wall(s) relative to the length and/or height of the cargo area 358. For example, the anchor tracks or rails 368 may be spaced about four feet from each other along the length of the cargo area 358. In some implementations, the anchor tracks or rails 368 may be contained within channels or grooves that are recessed into the interior side wall(s) or corresponding panels 357. In some implementations, such anchor tracks or rails 368 may be sized and dimensioned to physically couple to insertable tabs on movable pieces of equipment. As such, the anchor tracks or rails 368 may have a number of attachment locations (e.g., apertures through which pins, tabs, or bolts may be placed) spaced therealong that may be used to secure a plurality of food preparation and/or storage equipment of an almost unlimited variety along the interior side wall(s) of the cargo area 358 and configure such food preparation and/or storage equipment in any number of ways.

When some or all of an anchor tracks or rails 368 are not in use, the portion of the anchor tracks or rails 368 not in use may be concealed using a cover or cap or similar device that may be made of lightweight, durable material. The cover or cap may cover the channels or grooves and may releaseably and securely engage peripheral edges of the channels or grooves along the interior side wall that delineate the respective channels or grooves in which the tracks or rails 368 are recessed. Using such a cover may enable the side wall(s) to present a smooth, planar surface when one or more anchor tracks or rails 368 are not in use. Presenting a smooth, planar surface may advantageously enable easy cleaning of the interior side walls, and prevent food, grease, or other materials from becoming trapped within the anchor tracks or rails 368.

As shown in diagram 300C, a number of retractable bolts 370 may be securely, releaseably attached to the anchor tracks or rails 368 along the interior side wall(s). The retractable bolts 370 may be spaced and dimensioned along the anchor tracks or rails 368 to secure food preparation and/or storage equipment. The retractable bolts 370 may be arranged in columns and/or rows. Other configurations and layouts of the retractable bolts 370 may be possible. In some implementations, the retractable bolts 370 may include a cylindrical portion 369 that extends horizontally along a central axis through one or more brackets that extend outward from the interior side wall. Attachment locations of the retractable bolts 370 may be spaced and dimensioned to spatially align with a corresponding attachment point (e.g., a bracket) on food preparation and/or storage equipment to thereby secure the various food preparation and/or storage equipment that may be loaded into the cargo area 358.

One or both of the interior side walls may include one or more power outlets 371 that may be spaced along the interior side walls. In some implementations, the power outlets 371 may be regularly spaced on the interior side wall relative to the length and/or height of the cargo area 358. For example, the power outlets 371 may be regularly spaced every one and one-half feet, two feet, two and one-half feet, or more or less on the interior side wall along the length of the cargo area 358. The power outlets 371 may be electrically coupled to one or more power supplies and be operable to supply power at one or more voltages. In some implementations, groups of power outlets may be arranged to provide different voltages. The power outlets may also be configured to be compliant with various standards or protocols, for instance standards or protocols for electrical outlets or receptacles specified by the National Electrical Manufacturers Association (NEMA). Example voltages may include, but are not limited to, 12V, 110V, 120V, 220V and 240V. In some implementations, one of the power supplies may be operable to provide power, for example, to a USB connector or other such connectors that may electrically couple to one or more low voltage devices, such as custom electronics, embedded processors, sensors (e.g., Internet-of-things devices), and other such devices.

One or both of the interior side walls may optionally include a set of communication ports 374 that are communicatively coupled to the control system 365 via one or more communication connectors (not shown) that may be located behind the interior side walls and/or the rear wall 363, and/or above the ceiling 366. The communication ports 374 may be spaced regularly along the interior side walls. The food preparation and/or storage equipment may physically couple to the communication port 374 to thereby complete a communications link between the food preparation and/or storage equipment and the control system 365. In some implementations, the communication connections may be one or more of parallel cables or serial cables capable of high-speed communications, for example, via one or more of FireWire®, Universal Serial Bus® (USB), Thunderbolt®, Gigabit Ethernet®, a CAN bus, a Modbus, or any other type of standard or proprietary communication linked interface using standard and/or proprietary protocols. In some implementations, the communication port 374 may include optical fiber. In some implementations, the communication port 374 may include a wireless transceiver that communicates wirelessly with the control system 365 via a short-range wireless communications protocol (e.g., Bluetooth®, Bluetooth® Low Energy, WIFI®, NFC).

Figure 3D:
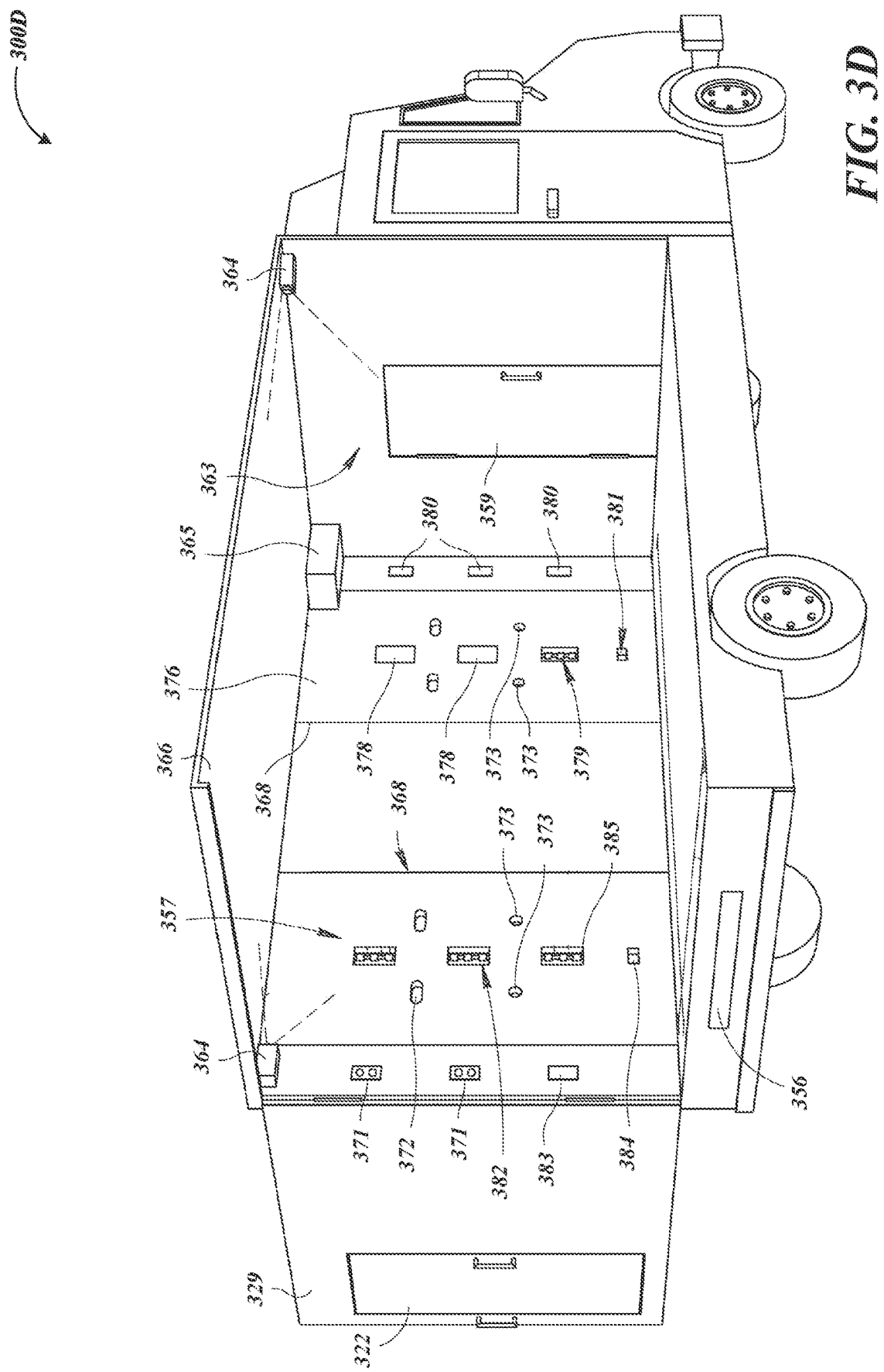
FIG. 3D includes an isometric exterior view of an example truck with a right-hand interior side wall cut away showing another rack mounting configuration to install equipment for en route food product preparation.

FIG. 3D includes an isometric exterior view of an example truck with a right-hand interior side wall cut away showing another rack mounting configuration to install equipment for en route food product preparation, arranged in accordance with at least some embodiments described herein.

Diagram 300D shows another inside configuration of the delivery truck of FIG. 3A with a different set customizations to accommodate autonomous food preparation equipment. In addition to the customization elements discussed above, one or both of the interior side walls may include a set of water ports 373 that are fluidly communicatively coupled to a water tank via one or more water conduits (not shown) that may be located behind the interior side walls and/or below the floor. The water ports 373 may be spaced regularly along the interior side walls. The food preparation and/or storage equipment may physically couple to the water ports 373 to thereby provide fluid communication between the food preparation and/or storage equipment and the water tank. In some implementations, the water tank may be a pressurized water tank that stores the water (or other fluid) at a high pressure, i.e., above 1 atmosphere and/or may be gravity feed. Thus, when a water valve is physically coupled to the water port 373 and opened, water may thereby flow from the water tank through the water port 373 and out of the fluidly communicative, physically coupled valve. In some implementations, one or more pumps may be located with the cargo area 358 and may be fluidly communicatively coupled to the water tank. As such, the pumps may be operable to draw water from the water tank for use by equipment in the cargo area 358.

One or both of the interior side walls may also include a set of waste fluid ports that are fluidly communicatively coupled to a waste fluid tank via one or more water conduits (not shown) that may be located behind the interior side walls and/or below the floor. The waste fluid ports may provide fluid communication between the food preparation and/or storage equipment and the waste fluid tank. One or both of the interior side walls may further include a set of pressurized gas ports 372 that are fluidly communicatively coupled to a pressurized gas tank via one or more air conduits (not shown) that may be located behind the interior side walls and/or below the floor. The pressurized gas ports 372 may be spaced regularly along the interior side walls. The food preparation and/or storage equipment may physically couple to the pressurized gas ports 372 to thereby provide fluid communication between the food preparation and/or storage equipment and the pressurized gas tank, or a compressor. In some implementations, the pressurized gas tank may be a pressurized air tank that stores the air at a high pressure, i.e., above 1 atmosphere. Thus, when a valve is physically coupled to the pressurized gas port 372 and opened, pressurized air may thereby flow from the pressurized gas tank through the pressurized gas port 372 and out of the fluidly communicative, physically coupled valve. In some implementations, one or more compressors or pumps may be located with the cargo area 358 and/or within one or more of the compartments. As such, the compressors or pumps may be operable to create a source of pressurized gas without the need of the pressurized gas tank, or alternatively can be fluidly coupled to supply pressurized gas to the pressurized gas tank.

The floor may be a substantially flat surface that is parallel to the ground and form a horizontal surface when the vehicle is parked on a flat, even surface. The floor may be elevated above the set of wheels and corresponding wheel wells of the vehicle. The floor may comprise aluminum, stainless steel, linoleum, or any other lightweight, hard, durable surface which can be easily and thoroughly cleaned. In some implementations, the cleaning of such surfaces may be performed according to or to meet various state, local, or other such health department requirement. In some implementations, a fire barrier may be adjacent to and underneath the floor, ceiling and/or sidewalls. An uninterrupted, flat floor may advantageously be used in connection with the regularly spaced anchor tracks or rails 368 to modularly design the cargo area 358, thus providing flexibility in creating the necessary preparation and storage space to prepare any number of different types of food items. Further, placing the anchor tracks or rails 368 at regular intervals along the length and height of the interior side walls enables various types of food preparation and storage equipment to be loaded into the cargo area 358. Such modularity may be further increased by providing regularly spaced power outlets, air ports, water and waste ports, etc., in the cargo area 358. The cooking equipment that may be loaded into the cargo area 358 may include ovens (convention, gas, or electric, for example), deep fryers, roasters, popcorn makers, grills, griddles, sandwich/tortilla presses, or any other type of cooking equipment.

One or both of the interior side walls may also include a plurality of recessed cavities 382 arranged relative to the length and/or height of the cargo area 358. Each of the recessed cavities 382 may contain one or more of: a stationary post, a power outlet, a water port, a waste fluid port, a gas port, and a communication port (collectively shown as port 385). The recessed cavities 382 may be sufficiently recessed into the interior side walls such that the contained component or port does not intrude into the cargo area 358. The cavities 382 may be of various sizes, including a large recessed cavity 382 and a small recessed cavity 381. In some implementations, the size of each cavity may depend upon the component or port that is contained within the cavity. For example, a large cavity 382 may be used to contain a stationary post, and a small cavity 381 may be used to contain a power outlet or any of the water ports. In some implementations, a cover 378 may be used to cover a recessed cavity containing a component that is not currently being used, for example, stationary posts that have no attached food preparation and/or storage equipment. The cover 378 may comprise aluminum, stainless steel, or some other light weight, durable material. The cover 378 may be selectively removably physically coupled to the interior side wall and may cover a recessed cavity when the cover 378 is physically coupled to the interior side wall. In some implementations, the covers may be sized and dimensioned based upon the corresponding recessed cavity the cover is to be placed over. As such, the covers may be of different sizes, for example, with large covers 378 covering large recessed cavities 382 and with small covers 380 covering small recessed cavities (381, 384). Stationary posts of various radiuses may be provided within the recessed cavities to provide attachment locations to the food preparation and storage equipment.

The cargo area 358 may include an on-board control system 365 that may enable the vehicle to operate in a connected mode in which the on-board control system 365 is communicatively coupled to an off-board control system (e.g., remote control system 302), as discussed previously. In the connected mode, the off-board control system may provide routing, delivery, and/or preparation instructions to components in the vehicle. The on-board control system 365 may be operable to function in a stand-alone mode in which the on-board control system 365 is not communicatively coupled to the off-board control system. The on-board control system 365 may be operable to enter a recovery mode at a time when the on-board control system 365 regains a communication connection with the off-board control system and is transitioning from a stand-alone mode to a connected mode.

In some implementations, the cargo area 358 may include one or more cameras 364 that may be oriented to capture images of the cargo area 358. Each of the cameras 364 may have a field of view in which the camera 364 may capture still or moving images. In some implementations, the field of view of each camera 364 may encompass substantially the entire cargo area 300b. In some implementations, the cameras 340 may be used to capture and provide live images. Such live images may be transmitted via the radio and antenna to a remote location, such as to the off-board control system so that the food preparation and delivery operations of the vehicle may be monitored. In some implementations, the live images from the cameras 364 may be supplied to the display or monitors located along the exterior side wall(s) of the vehicle and visible from the exterior of the vehicle. In some implementations, the various cameras 364 and/or displays or monitors may be attached to the ceiling 366 of the vehicle or be attached to be flush against the interior side walls. As such, the cameras 364 and/or displays or monitors may not intrude into the floor or interfere with the modular design of the cargo area 358.

Figure 4A:
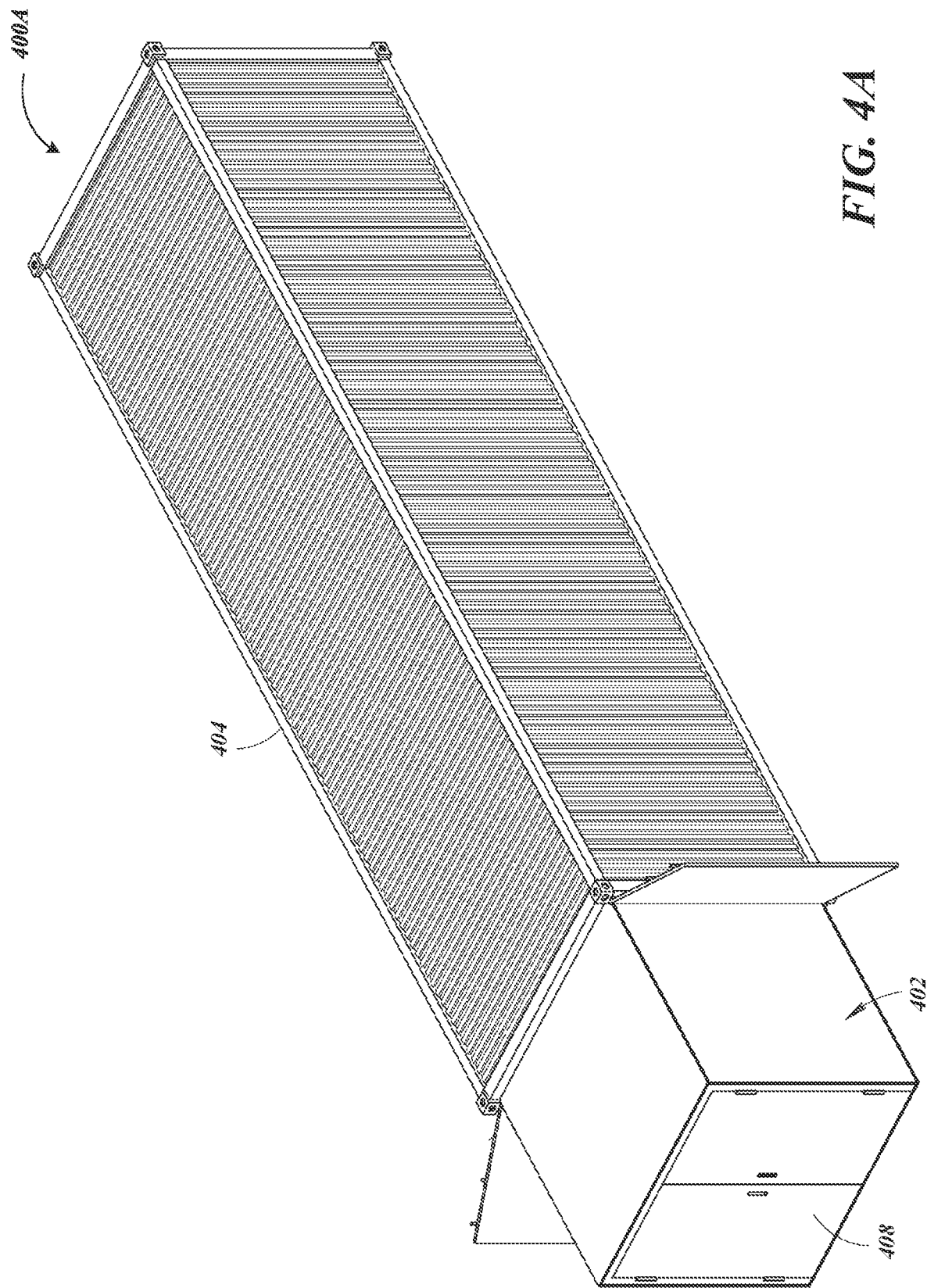
FIG. 4A includes an isometric exterior view of an example cargo container that may include equipment for en route food product preparation.

FIG. 4A includes an isometric exterior view of an example cargo container that may include equipment for en route food product preparation, arranged in accordance with at least some embodiments described herein.

Diagram 400A shows a standard intermodal shipping container 404. The container 404 may have same or similar features as corresponding standardized shipping containers in use throughout the world, and dimensions and other characteristics in accordance with corresponding standards for shipping containers. In some implementations, the container 404 may have an external an elongated side face, a top face, and a front end comprising a pair of doors.

In some embodiments, a food preparation container 402 may be dimensioned to slide into and fit inside a shell of the shipping container 404. The food preparation container 402 may include a pair of doors 408 for access to the inside space. The food preparation container 402 may be configured to house autonomous food preparation equipment such that food items may be loaded into the container at a starting station and food products may be completed by the time the food preparation container 402 reaches its destination. The food preparation container 402 may have access ports as discussed above in conjunction with the delivery truck. Thus, in some cases, the dimensions of the food preparation container 402 may be smaller than the shipping container 404 acting as the outer shell.

In some alternative implementations, the food preparation container 402 may be configured and dimensioned to slide into and fit inside a semi-truck trailer, loaded onto a flatbed truck, a railway car, a watercraft, or similar vehicles. The food preparation container 402 may be installed in such vehicles with or without the shipping container 404 acting as outer shell. The food preparation equipment inside the container 402 may be configured in a modular fashion to provide a sterile environment for preparation of food items autonomously. As such, the food preparation container 402 may include suitable control, power, communications, and computing equipment in addition to the food preparation equipment such as transport or processing robots, cooking devices, cooling devices, storage equipment, etc.

Figure 4B:
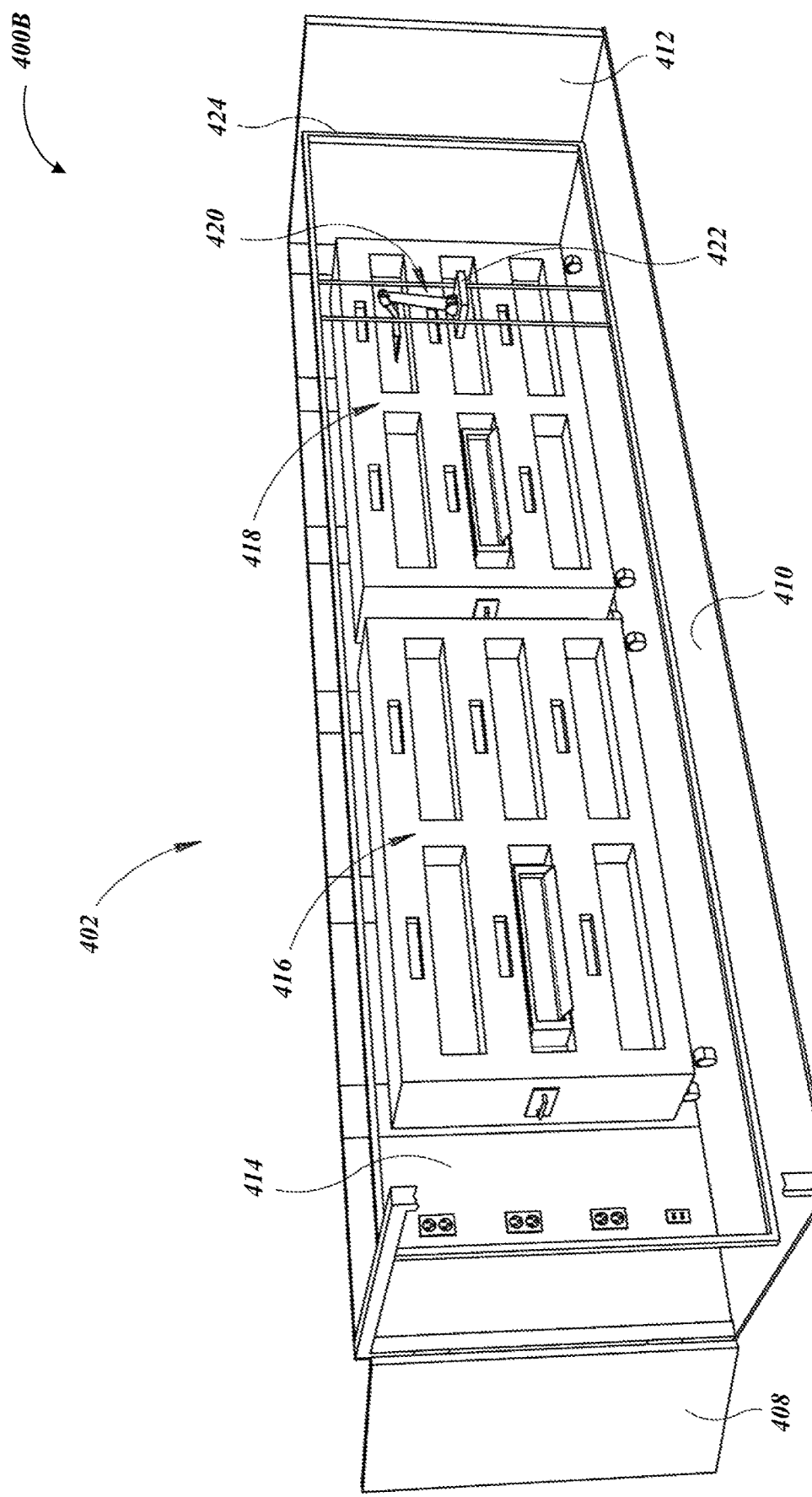
FIG. 4B includes an isometric exterior view of an example cargo container with a right-hand interior side wall cut away showing racks of heating and storage equipment for en route food product preparation.

FIG. 4B includes an isometric exterior view of an example cargo container with a right-hand interior side wall cut away showing racks of heating and storage equipment for en route food product preparation, arranged in accordance with at least some embodiments described herein.

Diagram 400B shows an inside configuration of the food preparation container 402 of FIG. 4A with example autonomous food preparation equipment. In the example configuration of diagram 400B two racks 416, 418 of food preparation equipment are installed within the container 402 against the wall 414 on the floor 410. The two racks 416, 418 may have the same or similar features. A frame 424 may be installed through the middle of and along the length of the container 402, and a transfer robot platform 422 may be installed on the frame 424. A transfer robot 420 (see FIG. 4E) may be installed on the transfer robot platform 422. The racks 416, 418 may house ovens, grills, coolers, storage drawers, or comparable equipment. Food items and supplies may be delivered into the container through the door 408 or other ports and doors that may be installed at suitable locations in suitable dimensions depending on the equipment configuration and food type(s).

While specific types of equipment have been illustrated as being installed in the container 402, any food preparation equipment, such as any of the food preparation equipment described herein or food preparation equipment capable of performing any of the food processing or preparation procedures described herein, may be installed in the container 402. In some cases, the order in which the equipment is installed against the walls, front-to-back along the length of the container 402, may not be important, such as when each piece of food preparation equipment works independently, while in other cases, the order in which the equipment is installed, front-to-back along the length of the container 402, is important, such as when the products produced by one piece of food preparation equipment are used as an input by another piece of food preparation equipment.

Food preparation equipment may also be provided in any number of rows, such as one, two, three, four, or five rows extending along the length of the container 402. As another example, food preparation equipment may be provided in any number of layers, such as one, two, three, four, or five layers stacked vertically on top of one another. In general, the arrangement of the equipment within the interior space of the container 402 may be determined or driven by improvements to the overall efficiency of the food preparation system. In some implementations, the inner surfaces of the walls and doors may be made of various plastics or of stainless steel, brass, aluminum, or other oligodynamic materials. In some examples, container 402 may have no openings other than the doors 408, that is, the container 402 may have no other doors, windows, or openings, and the doors 408 may be closed to seal, such as hermetically seal, the interior of the container 402 from an external environment. In other implementations, the container 402 may have one or more segmented airlocks to control, allow, or prevent the flow of air between the interior of the container 402 and the external environment, and prevent or contain infestations. In some implementations, the container 402 may include one or more lighting systems, such as internal LED lighting systems, internal high-pressure sodium vapor lamp lighting systems, or skylights or windows to provide natural light to the interior of the container 402. In some cases, the interior of the container 402 may be provided with a combination of LED and natural lighting. In some implementations, mirrors, lenses, and/or other optical elements may be used to focus and/or direct light from its source(s) to location(s) where it is desired.

Figure 4C:
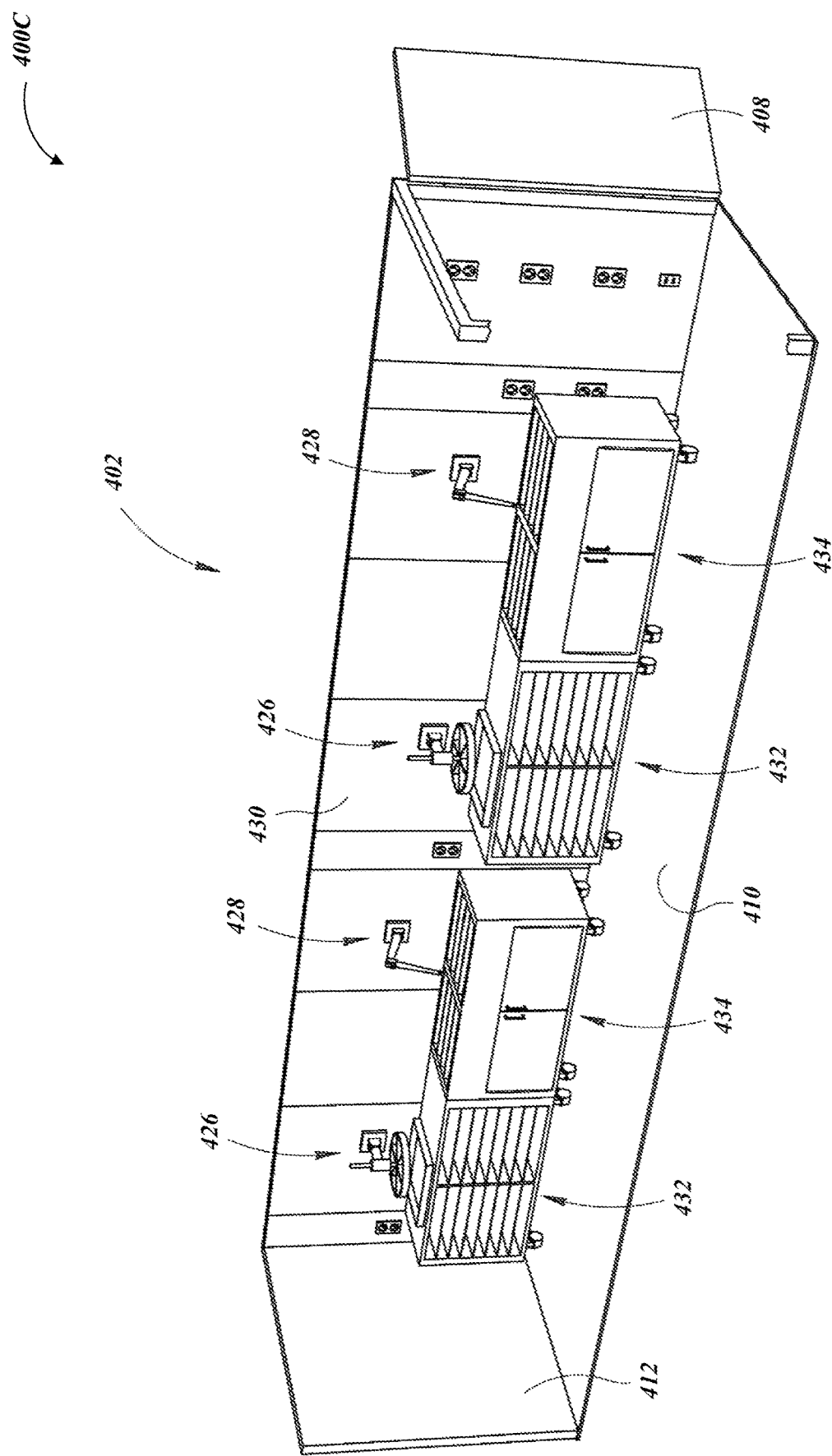
FIG. 4C includes an isometric exterior view of an example cargo container with a right-hand interior side wall cut away showing racks of autonomous preparation equipment for en route food product preparation.

FIG. 4C includes an isometric exterior view of an example cargo container with a right-hand interior side wall cut away showing racks of autonomous preparation equipment for en route food product preparation, arranged in accordance with at least some embodiments described herein.

Diagram 400C shows another inside configuration of the food preparation container 402 of FIG. 4A with another set of example autonomous food preparation equipment.

In the example configuration of diagram 400C, two sets of food preparation equipment with two identical configurations are installed within the container 402 against the wall 430 on the floor 410. The two sets of equipment include two toppings holders 434, two dispensing robots 428, two food preparation/storage units 432, and two cutters 426 installed against the wall 430. In some implementations, the container 402 may include one or more cleaning systems, such as a robotic cleaning system that sweeps, mops, and/or vacuums various surfaces within the container 402, and/or a UV lighting system that can be used to disinfect and self-clean the interior of the container 402. In some implementations, the interior of the container 402 may also be manually cleaned from time to time. Such automated and manual cleaning systems and techniques can be combined to maintain a level of cleanliness within the interior of the container 402 that meets or exceeds legal requirements and other standards for cleanliness in food processing or preparation facilities.

In some implementations, the container 402 may be provided with equipment to control a temperature, a pressure, a humidity, an oxygen level, a carbon dioxide level, a nitrogen level, an argon level, levels of other inert gases, levels of other chemical compositions, and/or other properties of the air within the interior of the container 402. In some implementations, such equipment may create distinct zones or regions within the interior of the container 402 that have different temperatures, different pressures, different humidities, different oxygen levels, different carbon dioxide levels, different nitrogen levels, different argon levels, different levels of other inert gases, different levels of other chemical compositions, and/or different levels of other properties.

Such zones within the container 402 may be used for different purposes, such as to delay oxidation of food items or to accelerate ripening of food items. In one specific implementation, the interior of the container 402 can be compartmentalized into a sanitary food processing or preparation portion and a processed or prepared food storage portion separated from one another by an airlock or an air curtain. In another specific implementation, an entire interior of the container 402 can be refrigerated. In some implementations, the container 402 may include one or more air sampling and testing systems to test the properties of the air within the container 402, such as a temperature, a pressure, a humidity, an oxygen level, a carbon dioxide level, a nitrogen level, an argon level, levels of other inert gases, levels or other chemical compositions, and/or any levels of other properties of the air within the interior of the container 402. In some implementations, the container 402 may include one or more sensors that monitor at least one condition representative of hygiene in the interior of the first container. In such implementations, the one or more sensors can be responsive in real-time to the presence of air-borne or surface-borne pathogens. In such implementations, the one or more sensors can be responsive in real-time to the presence of infestations such as listeria or *E. coli*.

Figure 4D:
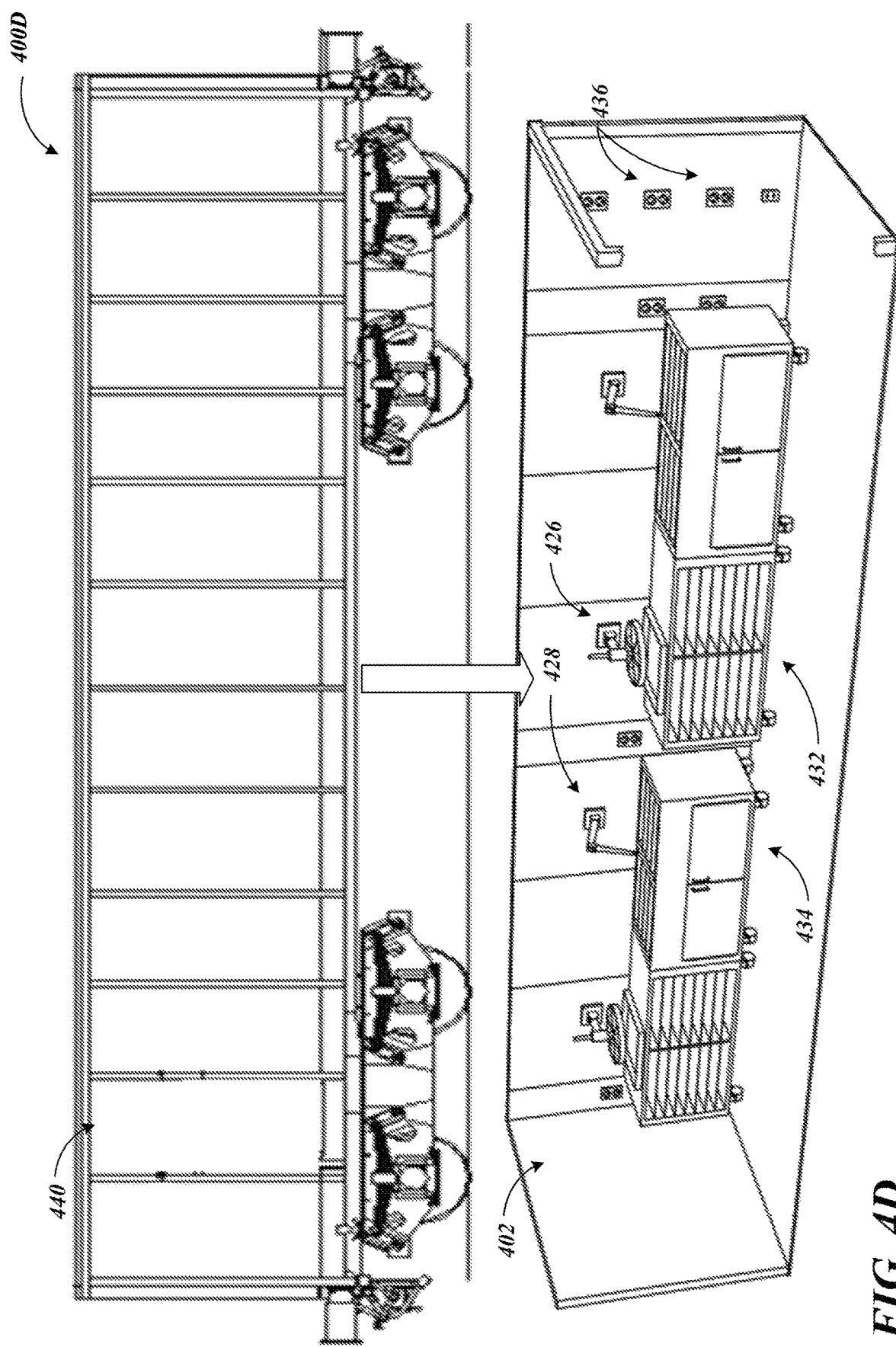
FIG. 4D includes an isometric exterior view of an example railway car with equipment for en route food product preparation.

FIG. 4D includes an isometric exterior view of an example railway car with equipment for en route food product preparation, arranged in accordance with at least some embodiments described herein.

Diagram 400D shows a food preparation container 402 with food processing equipment 432, 434, robotic devices 426, 428, and various supply interfaces (e.g., power outlets 436) as described above. The food preparation container 402 may be installed on a railway car. In some examples, the food preparation container 402 may include an outer shell like the shipping container 404 of FIG. 4A and be loaded onto a flat railway car for a portion of the route, and then loaded onto another vehicle (e.g., a transport ship) for another leg of the route. Additionally or alternatively, the food preparation container 402 may be fitted inside an existing container 440 of a vehicle, e.g., railway car, transport ship and/or container truck for one or more legs of the complete route of the food preparation container and may be transferred to another vehicle for portions of the route. While the food preparation container 402 (and the shipping container 404 of FIG. 4A) are shown without access windows, example embodiments may include access windows enabling delivery of food products or intake of food items on exterior surfaces of the container.

Figure 4E:
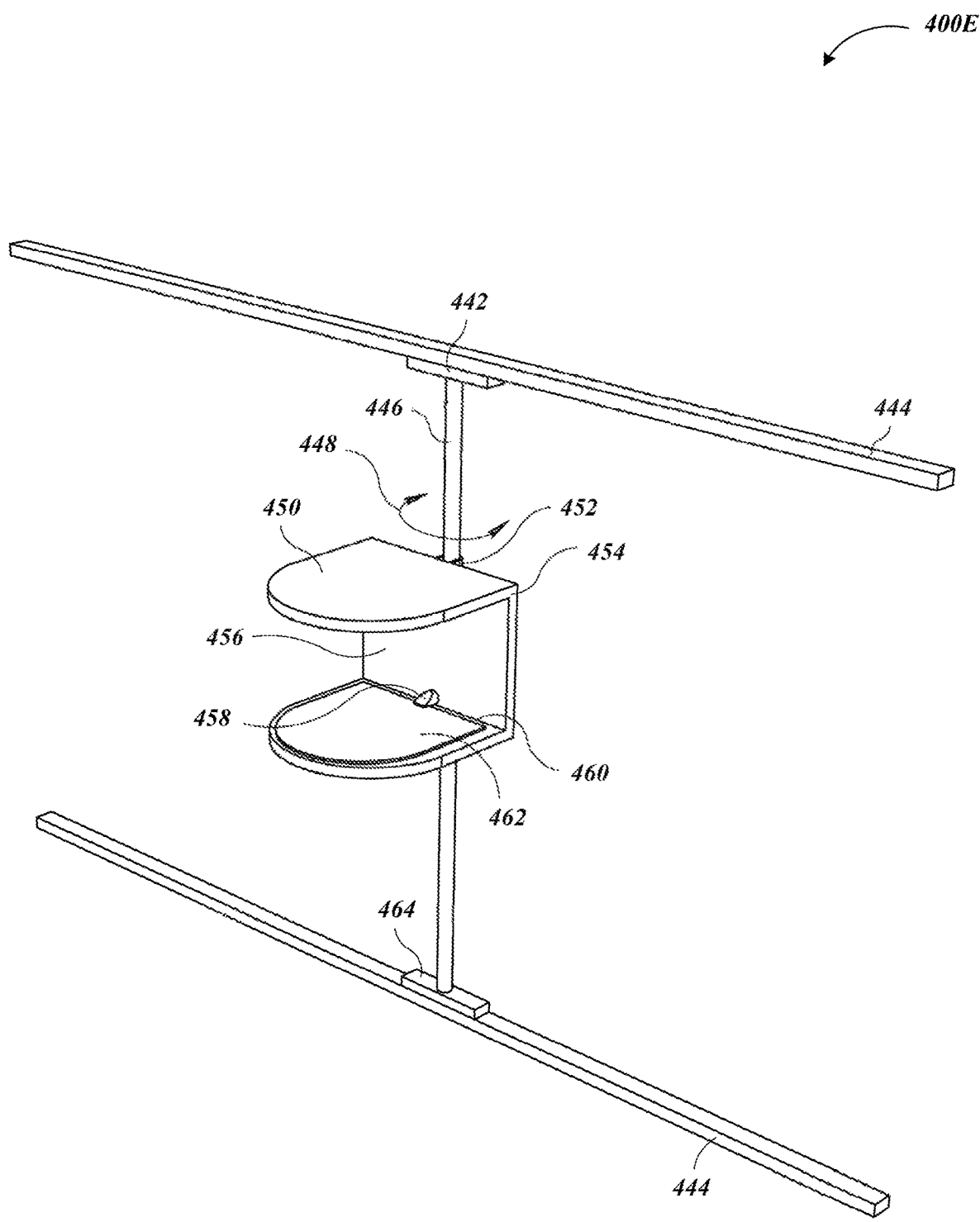
FIG. 4E includes a side elevational view of an example transfer robot that may be used within a delivery vehicle or container to move food items between food preparation equipment.

FIG. 4E includes a side elevational view of an example transfer robot that may be used within a delivery vehicle or container to move food items between food preparation equipment, arranged in accordance with at least some embodiments described herein.

The transfer robot shown in diagram 400E may include a transfer unit 454, a vertical post 446, and a set of horizontal tracks 444. The transfer unit 454 may include a side wall(s) 456, a top cover 450, and a bottom surface 460. The side wall(s) 456 and/or top cover 450 may advantageously be used to cover and protect food items being transferred within the cargo portion of the delivery vehicle. The transfer unit 454 may include an end effector 462, such as a pizza peel or a set of opposable digits, located proximate the bottom surface 460 of the transfer unit 454. The end effector 462 may be used to transfer food items between the various food preparation and cooking equipment and stations. The end effector 462 may extendably physically couple to the side wall(s) 456 of the transfer unit 454 via an extendable arm 458. Such an extendable arm 458 may be used, for example, to extend the end effector 462 into an oven compartment to place or retrieve a food item.

The transfer unit 454 may selectively rotatably movably couple to the vertical post 446 via a motor unit 452 (e.g., stepper motor with worm gear). In some implementations, for example, the vertical post 446 may have a length that extends from a location proximate the floor to a location proximate the ceiling in the cargo area of the delivery vehicle. The vertical post 446 may include a set of screw threads that extend along the length of the vertical post 446. The motor unit 452 may at least partially surround a portion of the vertical post 446 and include a threaded component (not shown) that engages with the threaded portion of the vertical post (e.g., jackscrew) 446. By rotating the threaded component, the motor unit 452 may affect vertical movement of the transfer unit 454 along the length of the vertical post 446. In some implementations, the motor unit 452 may affect rotational movement 448 of the transfer unit 454 around a vertical axis formed by the vertical post 446.

The vertical post 446 may be selectively movably coupled to a set of horizontal tracks 444 that, for example, extend at least partially along the floor and the ceiling, for instance from the front portion to the back portion of the cargo area. In some implementations, the vertical post 446 may couple to a motor 442 (e.g., stepper motor) that is movably coupled to one of the horizontal tracks 444 (e.g., upper horizontal track) and may be used to selectively move the vertical post 446 and transfer unit 454 in a horizontal direction along the length of the cargo are. The vertical post 446 may securely, movably couple to the other horizontal track 444 (e.g., lower horizontal track) via, for example, a set of rollers or wheels 464 that may travel along the horizontal track 444. The transfer robot may communicatively couple to a control system (e.g., on-board controller of the delivery vehicle) and may receive one or more signals that actuate one or more components of the transfer robot, resulting, for example, in vertical movement and/or horizontal movement of the transfer unit 454, and extension and/or retraction of the extendable arm 458 and end effector 462.

A transfer robot according to embodiments may be used to selectively transfer food items into and out of the ovens and other food preparation and storage equipment in a delivery vehicle. In some implementations, one or more actuators of the transfer robot may be operable to move an end tool with a predefined degrees (e.g., 6) of freedom with respect to the interior side walls. The end tool may include a finger extension that is sized and shaped to approximate the dimensions of a human finger. The finger extension may be used to engage with the handle on the door of each food preparation or storage equipment to thereby open or close the door as necessary to transfer food items into and out of the compartments of the food preparation or storage equipment. The transfer robot can move the end tool to transfer a food item, such as a parbaked pizza, into the compartment of an oven to be baked, for example. In some implementations, such as those involving pizzas, the end tool may include a pizza peel that is sized and dimensioned to enter into each of the compartments of the ovens contained within the rack. To place a parbaked pizza into an oven compartment for baking, the transfer robot may load the parbaked pizza to be baked onto the pizza peel portion of the end tool, open the door of the appropriate oven with the finger extension as described above, and then place the pizza peel portion of the end tool into the oven compartment. The transfer robot may tilt the pizza peel portion of the end tool to be at an angle directed downwards towards the back portion of the oven compartment to cause the parbaked pizza to slide off of the pizza peel. The end tool may include a camera or some other sensor that can be used to confirm that the parbaked pizza, or other food item, has been deposited into the oven compartment. The end tool may then move the pizza peel portion of the end tool out of the oven compartment and use the finger extension 1016 to close the door to the oven.

In some implementations, one or more sensors or imagers (e.g., cameras) may be positioned with a field-of-view that encompasses an interior of the food preparation units (e.g., ovens, refrigerators, combination refrigerator/ovens), or a field-of-view that encompasses an exit of the food preparation units or just downstream of the food preparation units. For example, one or more sensors or imagers (e.g., cameras) may have a field-of-view that encompasses a top of the food items, a bottom of the food items, and/or a side of the food items either in the food preparation units or at the exit of the food preparation units or even downstream of the food preparation units. One or more machine-vision systems may be employed to determine whether the parbaked, or even fully baked, food items (e.g., pizzas) are properly cooked based on images captured by the one or more sensors or imagers (e.g., cameras). The machine-vision system may optionally employ machine-learning, being trained on a set of training data, to recognize when the food is properly par-baked or even fully cooked, based on captured images or image data. In some instances, this can be combined with a weight sensor (e.g., strain gauge, load cell) to determine when the item of food is properly prepared, for example determining when an item is cooked based at least in part on a sensed weight where the desired weight is dependent on sufficient water having been evaporated or cooked off.

A machine-learning system or a machine-vision system may, for example, determine whether a top of the food item is a desired color or colors and/or consistency, for instance determining whether there is too little, too much or an adequate or desired amount of bubbling of melted cheese, too little, too much or an adequate or desired amount of blackening or charring, too little, too much or an adequate or desired amount of curling of a topping (e.g., curling of pepperoni slices), too little, too much or an adequate or desired amount of shrinkage of a topping (e.g., vegetables). The system may, for example, determine whether a bottom of the food item is a desired color or colors, for instance determining whether there is too little, too much or an adequate or desired amount of blackening or charring.

Additionally or alternatively, one or more electronic noses may be distributed at various points to detect scents which may be indicative of a desired property of the food item or prepared food item. For example, one or more electronic noses can detect via scent when cheese bubbles and crust forms. Electronic noses may employ one or more sensors (e.g., MOSFET devices, conducting polymers, polymer composites, or surface acoustic wave (SAW) microelectronic systems (MEMS) to detect compounds, for example volatile compounds). Also for example, one or more sensors or imagers (e.g., cameras) may be positioned with a field-of-view that encompasses a portion of an assembly line just prior to loading the food items in packaging, or transit refrigerators or transit ovens (refrigerators or ovens in which food items are transported in vehicles). The acquired information can be used to assess whether the food item has been correctly prepared, has the correct toppings and a satisfactory distribution (e.g., quantity and spatial distributions), does not contain foreign matter, has been correctly parbaked or evenly cooked. In response to determination that any single characteristic of the food time is unsuitable (e.g., outside a defined threshold or range of values), the food item may be rejected with a replacement order placed.

One or more machine-learning systems may be employed to learn when a food item, at one or more points of assembly, meet some expectation or standard. For example, a machine-learning system may learn what type of toppings are found on each of a set of defined pizzas that are available to order (e.g., meat lovers pizza pie, veggie pizza pie, plain cheese pizza pie, pepperoni pizza pie), The machine-learning system may be adaptive, able to self-classify ingredients or toppings, for instance cheese versus pepperoni. The machine-learning system may be able to identify a new ingredient or topping, and over time associate such with a new pizza added to the set of defined pizzas. The machine-learning system may be used to evaluate information (e.g., captured images or image data) captured via one or more machine-vision systems, for example determining what type of food item (e.g., what type of pizza) a given food item is, and assessing whether the food item belongs to a given order and/or matches the ordered food item. For example, the machine-learning system may determine whether the food item is correct (e.g., pizza has the correct toppings, has the correct crust (e.g., gluten versus gluten free), has the correct sauce), For instance, a gluten-free pizza can be visually discerned relative to one that includes gluten in the crust, for instance via a three-dimensional (3D) camera system. Also for example, the machine-learning system may determine whether the food item meets other desired criteria or properties (e.g., pizza has an adequate distribution of toppings, is evenly cooked, has adequate amounts and not too much charring, desired shape, desired size, desired spices). For instance, height of cheese and/or toppings may be assessed via a three-dimensional (3D) camera system, and the machine-learning system may be used assure that the height is within a range of acceptable heights with an upper and a lower bound, which may have been learned over a training data set. If a food item is incorrect or does not meet various criteria, the food item can either be diverted to be repaired, or can be sent to a waste receptacle and in response a replacement order placed in the queue, perhaps expedited to a point closer to actually being assembled than other orders in the queue, for instance to meet a desired time to delivery guarantee.

The cooking and/or conveyors and robots or other mechanisms can be automatically controlled based on any one or more of machine-vision based determinations, weight determinations, and/or detected scent-based determinations, and some defined criteria or conditions. Additionally or alternatively, the ovens, conveyors and/or robots can be automatically controlled based on any one or more of machine-vision based determinations, weight determinations, and/or detected scent based determinations, and some defined criteria or conditions. Additionally or alternatively, one or more robotic appendages (e.g., mechanical fingers) or a turntable or other actuator can be automatically controlled based on any one or more of machine-vision based determinations, weight determinations, and/or detected scent based determinations, and some defined criteria or conditions, for example turning an item (e.g., rotating a pizza to achieve even cooking or desired charring). While often described in terms of pizza, the structures and techniques can be applied to other food items, for instance fried chicken or burritos.

Figure 5A:
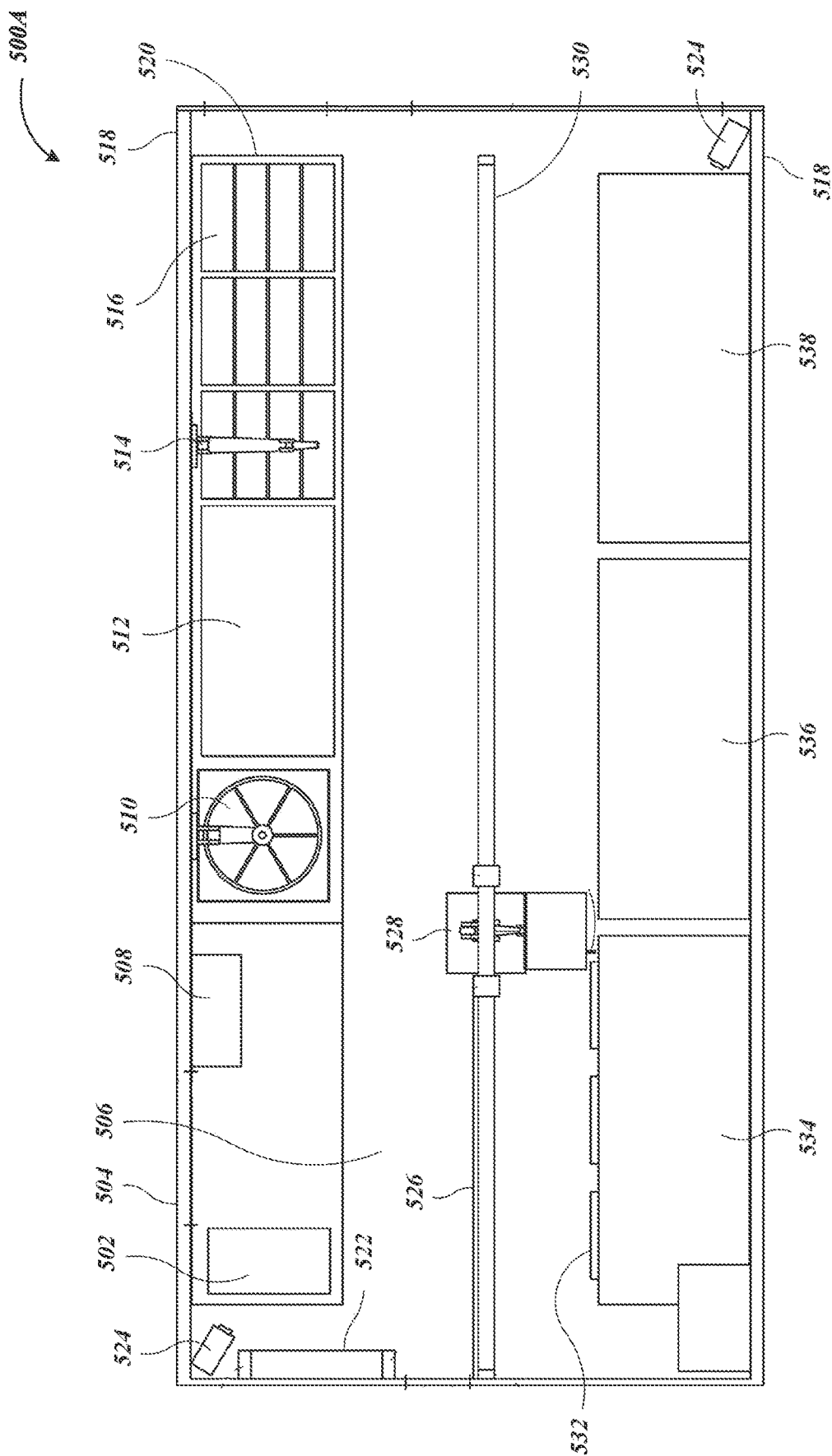
FIG. 5A includes a top plan view of a cargo area of a vehicle such as a truck that may be used for en route food product preparation in which the interior includes a number of equipment for autonomous processing.

FIG. 5A includes a top plan view of a cargo area of a vehicle such as a truck that may be used for en route food product preparation in which the interior includes a number of equipment for autonomous processing, arranged in accordance with at least some embodiments described herein.

Diagram 500A shows a layout of the cargo area of a vehicle that includes a service window 522. The cargo area further includes a transfer robot 528 that is selectively movable on a rail 530 along the length of the cargo area. The transfer robot 528 may be operable to place food items into and retrieve items from ovens 532 in racks 534. The transfer robot 528 may be operable to place the food items onto a food conveyor 512 proximate a dispensing robot 514. The dispensing robot 514 may be operable to dispense one or more toppings onto the food item, which may then be conveyed via the conveyor 512 towards and onto the cutting surface for the cutter 510. In some implementations, a human operator may be notified to transition the food item onto the cutting surface for the cutter 510. In other implementations, a robot, such as the transfer robot 528, may transition the food item onto the cutting surface for the cutter 510. The cutter 510 may cut the food item, which may then be placed into a container. In some implementations, the human operator may be notified to place a new food container base onto the cutting surface to receive the food item before the cutter 510 is activated to cut the food item. The operator may be notified to remove the food container base, and supported food item, to place a top onto the food container base, thereby preparing the food container for delivery to the customer. In further implementations, a non-food dispenser 508 may be located proximate the cutter 510, such as, for example, between the cutter 510 and the service window 522. The non-food dispenser 508 may dispense one or more non-food items (e.g., utensils or napkins) into or onto the container before the container is provided to the operator or delivered to a customer. In some implementations, the non-food dispenser 508 may include a printer that may be used to adhere one or more labels to the container identifying information relevant to the enclosed order (e.g., food item, recipient, address and/or delivery destination, time order placed, time food item prepared). In some cases, dispensing, transfer, conveyance of food items may be adjusted based on determined travel and environmental information (estimated measured, etc.). For example, a sealed food conveyor may be used when vehicle vibrations or sway are high based on road conditions. Additionally or alternatively, food item transfer processes and/or equipment may be slowed down to accommodate travel information leading to vehicle conditions at edges of operational parameters (high road tilt, vehicle sway or vibration, etc.). Additionally or alternatively, multifunctional equipment (e.g., a food processor, blender, cooking unit like conventional bread machines) may be selected and used for a food preparation process to reduce food item spillage, spoilage, etc. to accommodate expected or measured travel information.

In some implementations, speed racks 536 may be located on one side of the oven rack 534, whereas one or more of the toppings holders 516 (in holding rack 520), cutter 510, and dispensing robots 514, may be located on the opposite side of the rack 534. As such, the food item may be retrieved from the speed rack 536 to be loaded via a first door to the oven 532, and then ejected and/or retrieved from the second side of the oven to be transferred to a food preparation and/or packaging device. In some implementations, the cargo area may be used to prepare food items on-demand. Such an implementation may be used, for example, when the vehicle is to be used as a food truck to be positioned on the side of a road or in a parking lot (e.g., a parking lot of a sports stadium on game day) to sell food items to customers. In an on-demand situation, the cargo area may include one or more speed racks 536 and a service counter 504. The speed racks 536 may be secured to one or more anchor rails and/or retractable bolts located along the interior side wall 518. The speed racks 536 may be coupled to one or more power outlets, water ports, waste fluid ports, air ports, and/or communications ports located along the interior side wall 518. The speed racks 536 may include a plurality of slots arranged along multiple columns and rows, each of which may be sized and shaped to hold a partially prepared food item (e.g., a parbaked shell for pizza). In some implementations, the speed rack 536 may be a refrigerated enclosure such that the partially prepared food items are kept refrigerated to thereby preserve the freshness and extend the shelf-life of the partially prepared food items.

In other implementations, the speed rack 536 may have wheels or casters, to enable the speed rack 536 to be loaded into the cargo area of the vehicle for further processing and dispatch to delivery destinations. The wheels may optionally be driven by one or more electric motors via one or more drive trains. The transfer robot 528 may be operable to retrieve a partially prepared food item from one of the slots of the speed rack 536 and place the partially prepared food item onto the conveyor 512 proximate the dispensing robot 514. The dispensing robot 514 may be operable to dispense one or more toppings onto the partially prepared food item. The transfer robot 514 may then retrieve the topped, partially prepared food item from the conveyor 512 to be placed into one of the ovens 532 in the rack 534 to be fully baked. After the item has been fully baked the transfer robot 528 may retrieve the food item from the oven to be processed as described above. In some instances, an on-board control system and/or a remote control system may track information related to the contents of each oven and/or speed rack 536 that has been loaded into the vehicle. For example, the on-board control system and/or the remote control system may track for each oven and/or slot in the speed rack 536 the type of food item (e.g., parbaked shell, pepperoni pizza, etc.), the size of the food item, and/or the time that the food item was placed in the speed rack 536 or oven 532.

In some instances, the on-board control system and/or the remote control system may communicate with one or more other systems to determine the overall time that a food item has been placed in the speed rack 536 or oven 532, including time before the speed rack 536 or oven 532 was loaded into the vehicle. In some implementations, the on-board control system may not load all of the ovens 532 with food items for preparation at any one time. Instead, the on-board control system may keep at least some of the ovens 532 empty to process on-demand orders. In other implementations, at least some of the ovens 532 may be kept empty in order to process and prepare food items that are different and have different cooking parameters than food items currently being prepared. The on-board control system and/or the remote control system may set a time limit for keeping each food item within the speed rack 536 or oven 532. If the time limit expires for one of the food items, the on-board control system and/or the remote control system may alert the operator or customer to discard the food item. The on-board control system and/or the remote control system may require that the user provide an input to confirm that the identified food item has been discarded. Such input may include, for example, pressing a switch associated with the oven 532 containing the food item to be discarded or acknowledging a prompt on a computer screen.

In some implementations, the on-board control system and/or the remote control system may have access to one or more sensors or imagers that may indicate that the operator has removed the identified food item. Such sensors may include, for example, one or more images (e.g., cameras 524) that may be used to visually confirm that the oven is empty and/or or that the food item has been placed in a waste basket. Such sensors may also include sensors on the oven door that can detect when the door to the oven 532 has been opened. The cargo area may also include an operator area 506 where an operator can stand during an on-demand operation. The operator area 506 may be separated from the area used by the transfer robot 528 by a wall 526 that runs at least partially along the length of the cargo area. The operator area 506 may be around the service counter 504 and proximate the service window 522. In such a situation, the service counter 504 may be built into the cargo area 300. In other implementations, the service counter may be selectively movable from the cargo area and may therefore be secured to one or more anchor rails and/or retractable bolts located along the interior side wall 518. In some implementations, the service counter 504 may include a sink 502 or other wash basin that is sized and dimensioned to provide a wash area for an operator in the operator area 506. The sink may be fluidly coupled to a water tank and a waste fluid tank via one or more water ports and waste fluid ports included along the interior side wall 518.

Figure 5B:
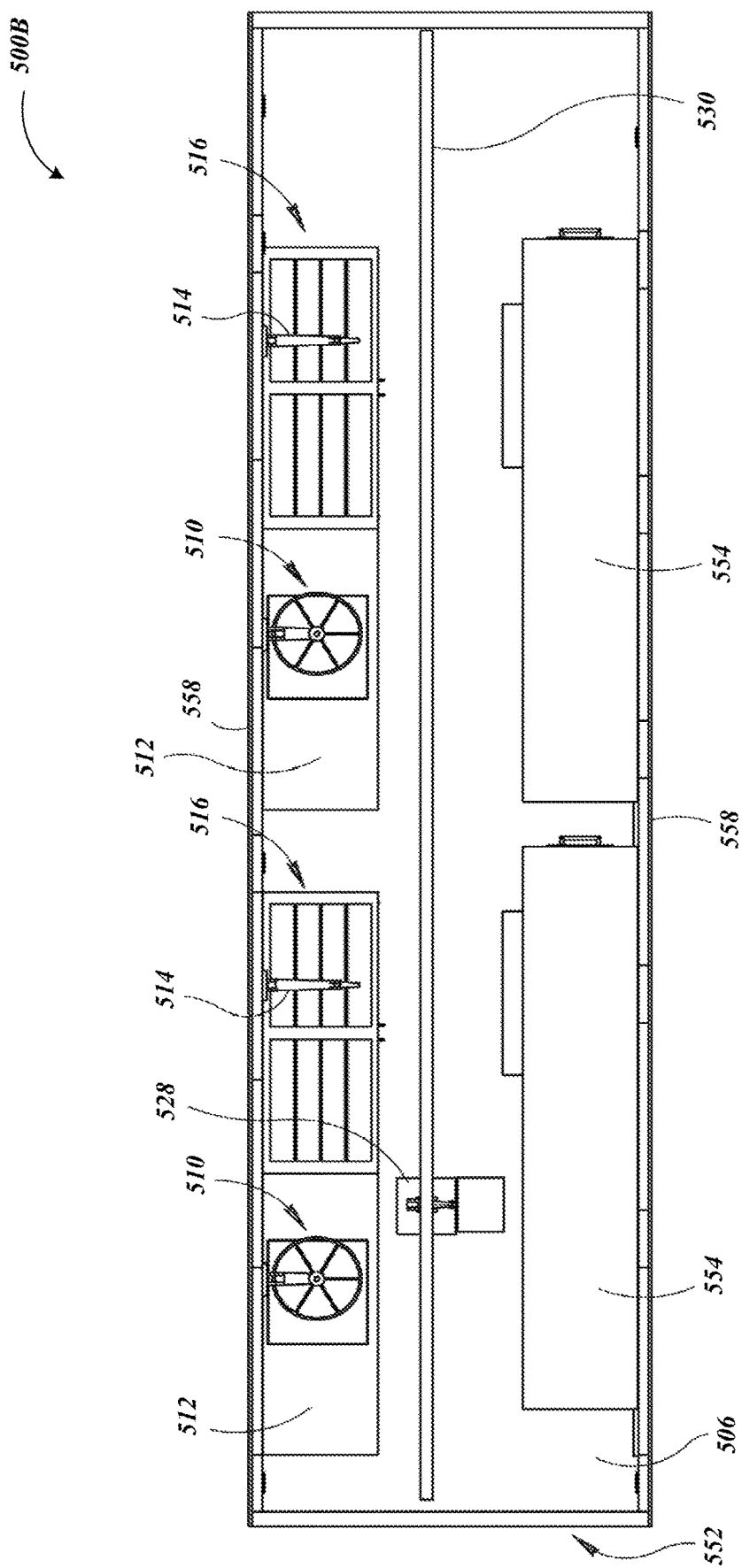
FIG. 5B includes a top plan view of a cargo area of a vehicle such as a railway car or a cargo container that may be used for en route food product preparation in which the interior includes a number of equipment for autonomous processing.

FIG. 5B includes a top plan view of a cargo area of a vehicle such as a railway car or a cargo container that may be used for en route food product preparation in which the interior includes a number of equipment for autonomous processing, arranged in accordance with at least some embodiments described herein.

Diagram 500B shows food preparation equipment installed within a container 552 against the walls 558. For example, racks 554 having the same features as the speed racks 536 described above may be installed against the wall 558 and a transfer robot platform 528 may be installed on the rail 530 along the length of the container. As further examples, toppings holders 516, dispensing robots 514, and cutters 510 may be installed against the opposite wall. While specific types of equipment have been illustrated as being installed against the walls 558 of the container, any food preparation equipment, such as any of the food preparation equipment described herein or food preparation equipment capable of performing any of the food processing or preparation procedures described herein, may be installed again the container using any suitable configuration. In some cases, the order in which the equipment is installed against the walls, front-to-back along the length of the container, may not be significant, such as when each piece of food preparation equipment works independently, while in other cases, the order in which the equipment is installed, front-to-back along the length of the container, may be predefined, such as when the products produced by one piece of food preparation equipment are used as an input by another piece of food preparation equipment.

While specific arrangements of food preparation equipment, including arrangements where the equipment is installed against the walls 558, have been illustrated, any arrangement of food preparation equipment may be used within the container. For example, food preparation equipment may be provided in any number of rows, such as one, two, three, four, or five rows extending along the length of the container. As another example, food preparation equipment may be provided in any number of layers, such as one, two, three, four, or five layers stacked vertically on top of one another. In general, the arrangement of the equipment within the interior space of the container may be determined or driven by improvements to the overall efficiency of the food preparation system. Inner surfaces of the walls and doors, as well as, surfaces of food preparation equipment may be made of various plastics or of stainless steel, brass, aluminum, or other oligodynamic materials. Doors, windows, or comparable openings may be closed to seal, such as hermetically seal, the interior of the container from an external environment. In other implementations, the container may have one or more segmented airlocks to control, allow, or prevent the flow of air between the interior of the container and the external environment, and prevent or contain infestations. In some implementations, one or more cleaning systems, such as a robotic cleaning system that sweeps, mops, and/or vacuums various surfaces within the container and/or a UV lighting system may be used to disinfect and self-clean the interior of the container. Such automated and manual cleaning systems and techniques may be combined to maintain a level of cleanliness within the interior of the container that meets or exceeds all legal requirements and other standards for cleanliness in food processing or preparation facilities.

In some implementations, the container may be provided with equipment to control a temperature, a pressure, a humidity, an oxygen level, a carbon dioxide level, a nitrogen level, an argon level, levels of other inert gases, levels of other chemical compositions, and/or other properties of the air within the interior of the container. The equipment may create distinct zones or regions within the interior of the container that have different temperatures, different pressures, different humidities, different oxygen levels, different carbon dioxide levels, different nitrogen levels, different argon levels, different levels of other inert gases, different levels of other chemical compositions, and/or different levels of other properties. Such zones within the container may be used for different purposes, such as to delay oxidation of food items or to accelerate ripening of food items. In one specific implementation, the interior of the container may be compartmentalized into a sanitary food processing or preparation portion and a processed or prepared food storage portion separated from one another by an airlock or an air curtain. In another specific implementation, an entire interior of the container may be refrigerated. The container may also include one or more air sampling and testing systems to test the properties of the air within the container, such as a temperature, a pressure, a humidity, an oxygen level, a carbon dioxide level, a nitrogen level, an argon level, levels of other inert gases, levels or other chemical compositions, and/or any levels of other properties of the air within the interior of the container.

Figure 6A:
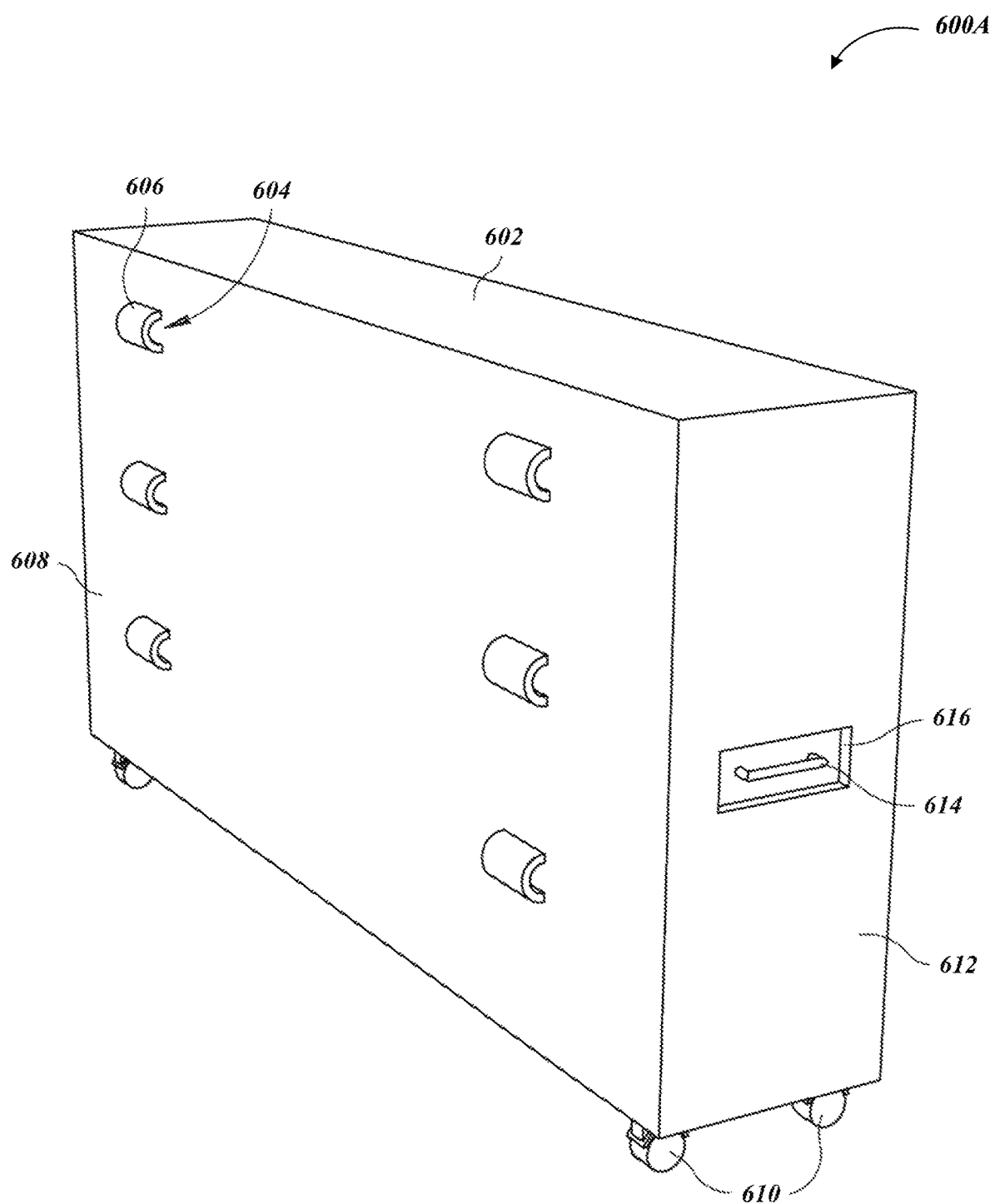
FIG. 6A includes a side isometric view of the back face of a rack that includes one or more unitary anchor points.

FIG. 6A includes a side isometric view of the back face of a rack that includes one or more unitary anchor points, arranged in accordance with at least some embodiments described herein.

In some implementations as illustrated in diagram 600A, a unitary anchor may comprise a unitary bracket 606 with an aperture 604 that extends through the bracket 606 on a back face 608 of the rack 602. The unitary anchor may be a tab that can be securely inserted directly into the anchor tracks or rails, which may run vertically and/or horizontally along the interior side wall(s) of the cargo portion of a vehicle equipped for en route food preparation. In such implementations, the locking of the unitary anchor into the anchor rails and/or the unlocking of the unitary anchor from the anchor rails may require the use of a locking/unlocking tool (e.g., a retractable lock). Such a unitary anchor may be oriented to complement the orientation of the anchor tracks or rails that run along the interior side wall(s).

Figure 6B:
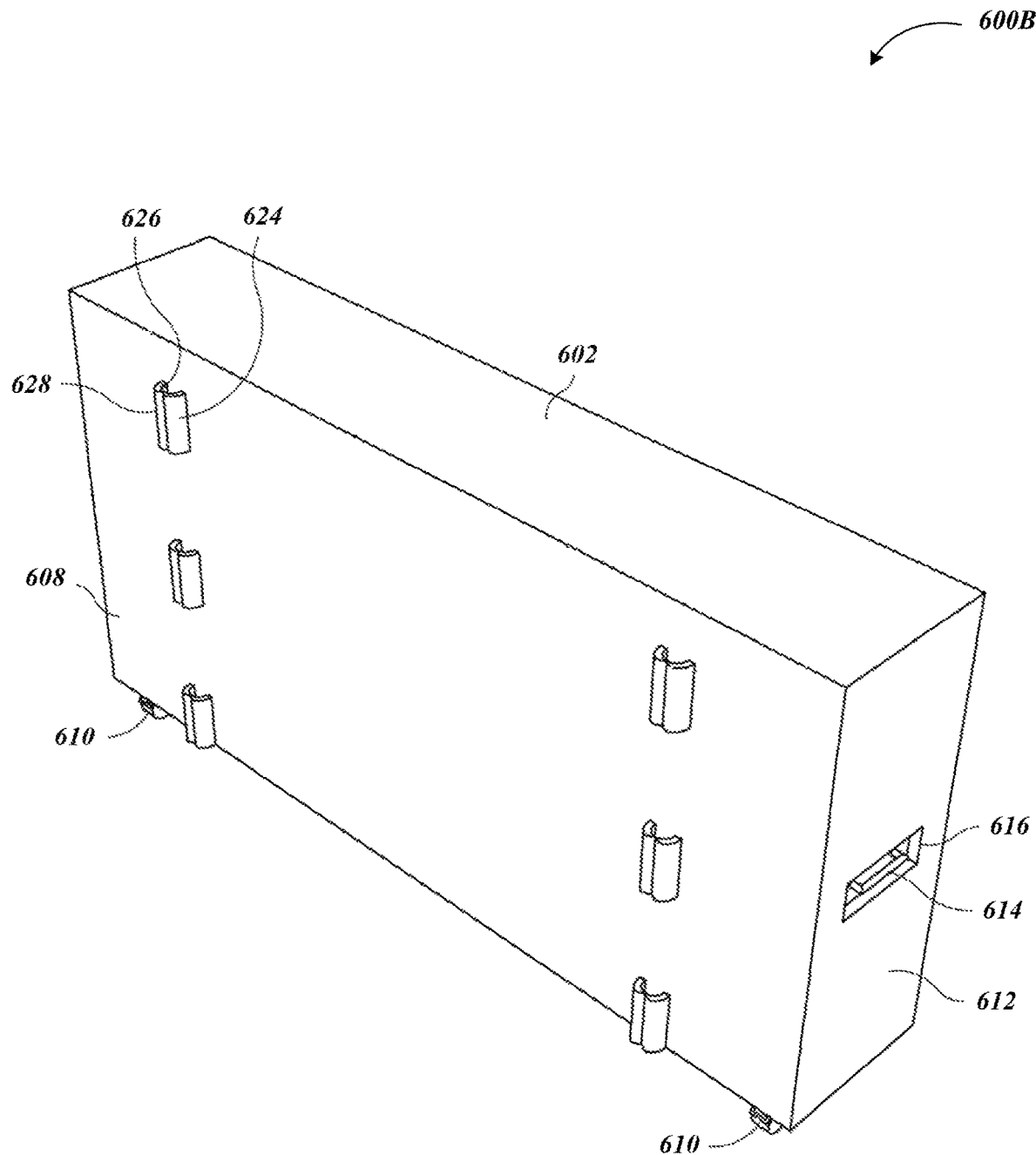
FIG. 6B includes a side isometric view of the back face of a rack that includes one or more separated anchor points.
Figure 6C:
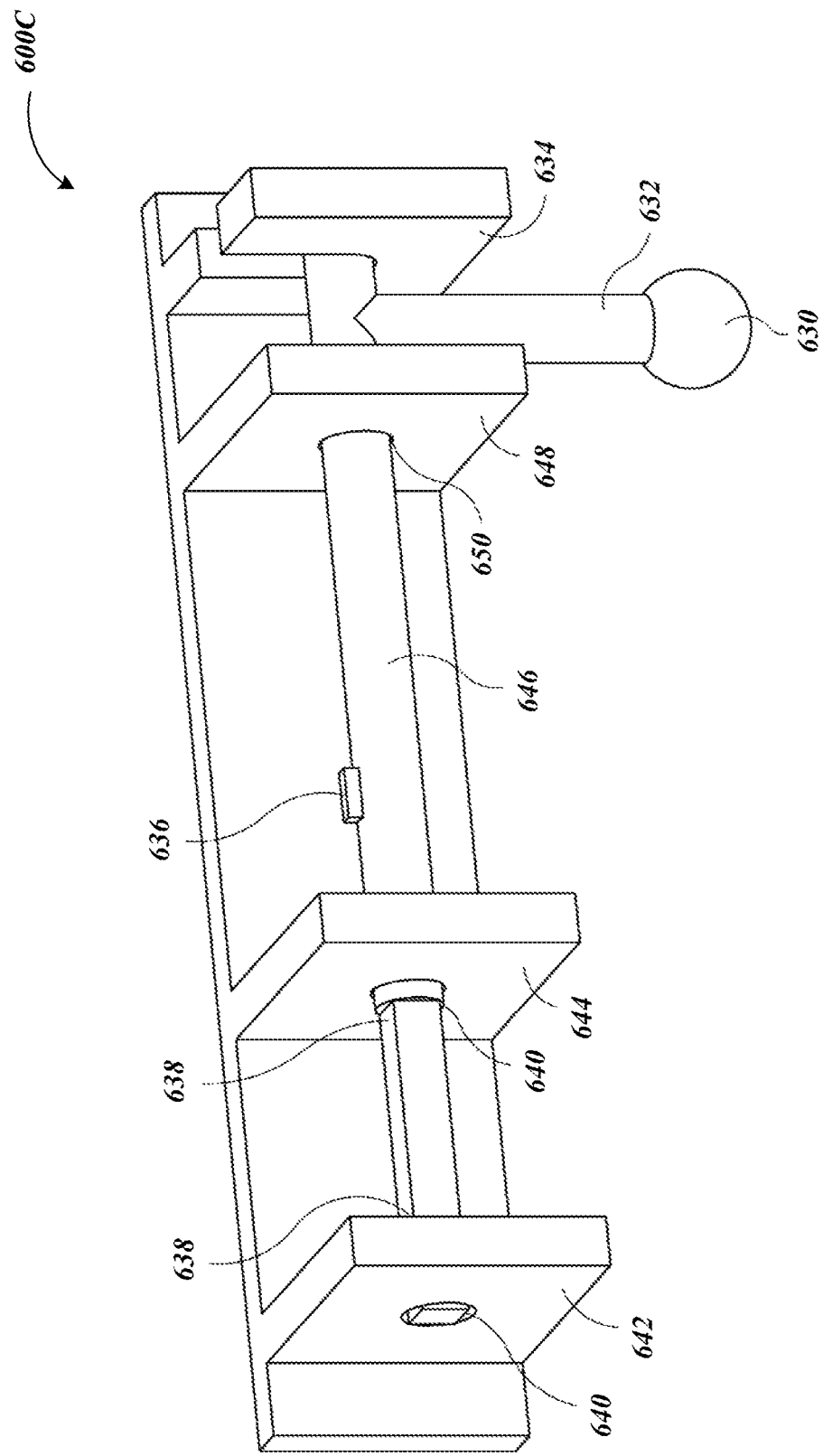
FIG. 6C includes a side isometric view of an anchor point.

The unitary bracket 606 may be used, for example, with a retractable bolt that moves between an open and a closed position (see FIG. 6C). In such an implementation, the aperture 604 may be oriented in the same direction as the bolt and may receive the attachment locations on the retractable bolt as the retractable bolt is moved from the open position to the closed position to secure the rack 602 to the interior side wall. Although the unitary brackets 606 are shown with the apertures 604 oriented in the horizontal direction, such a disclosure should not be considered limiting. The unitary brackets 606 may be positioned such that the aperture 604 is oriented horizontally, vertically, or any other angle to complement the orientation of the corresponding attachment locations on the bolt. In some examples, a handle 614 within a recess 616 on a side wall 612 of the rack 602 may be provided for human movement of the rack.

FIG. 6B includes a side isometric view of the back face of a rack that includes one or more separated anchor points, arranged in accordance with at least some embodiments described herein.

Diagram 600B shows a plurality of multi-piece anchors arranged in two vertical columns of anchors on a back face of the rack 602 also shown in FIG. 6A. The multi-piece anchors may be operable to physically, securely attach the rack 602 to the interior side walls. In some implementations, for example, the multi-piece anchors may be sized and positioned to align with a stationary post when positioning the rack 602 within the cargo area of a vehicle or in a container. The rack 602 may be pushed against the interior side wall to engage the multi-piece anchors with the stationary post, thereby securing the rack 602 within the cargo area. Each column of multi-piece anchors may be located proximate each outside edge of the back face 608 of the rack 602. In some implementations, the two columns may be spaced apart such that each column of multi-piece anchors may spatially align with two separate columns of stationary posts along the interior side walls of the cargo area. In some examples, a handle 614 within a recess 616 on a side wall 612 of the rack 602 may be provided for human movement of the rack.

In some implementations, the multi-piece anchors include a bracket that is formed by movably, rotatable opposing protrusions 628 and 624 that meet at an interface 626. The two opposing protrusions 628, 624 may rotate between a closed position in which the two opposing protrusions 628, 624 are engaged and applying opposing forces against each other, and an open position in which a gap separates the two opposing protrusions 628, 624. The opposing protrusions 628, 624 may form an aperture 626 along the back face 608 of the rack 602 when the opposing protrusions 628, 624 are pressed against each other in a closed position. The interface 626 may be oriented in the same direction as the corresponding stationary post to which the separated anchor is to couple. For example, the interface 626 may be oriented in a horizontal direction to couple to an anchor rail oriented in the horizontal direction and in a vertical direction to couple to an anchor rail oriented in the vertical direction.

Each of the two opposing protrusions 628, 624 may be selectively rotationally coupled to the back face 608 along vertical axes that extend along the back face 608 of the rack 602. The two opposing protrusions 628, 624 may each be physically coupled to one or more torsional springs that bias the two opposing protrusions 628, 624 to rotate towards each other until the two opposing protrusions 628, 624 physically engage and push against each other. Each of the two opposing protrusions 628, 624 may be beveled along the respective edges that form the interface 626 such that the two opposing protrusions 628, 624 separate when pressed against a complementary anchor rail, such as the stationary post. In some implementations, the two opposing protrusions 628, 624 may be spatially aligned with the corresponding attachment locations on the stationary posts in the cargo area. The aperture 626 formed by the two opposing protrusions 628, 624 may be sized and dimensioned to surround the attachment locations to secure the rack 602 to the interior side wall when the opposing protrusions 628, 624 are in the closed position. Although the multi-piece anchors are shown such that the aperture 626 is oriented in the vertical direction, such a disclosure should not be considered limiting. The multi-piece anchors may be positioned such that the aperture 626 is oriented horizontally, vertically, or any other angle to complement the orientation of the corresponding attachment locations on the post.

In some implementations the multi-piece anchors may be biased in an expandable configuration in which the two opposing protrusions 628, 624 may be biased to push away from each other (e.g., by using a biasing spring). In such an implementation, the multi-piece anchors may be mechanically and physically coupled into one of the anchor rails. As such, each of the two opposing protrusions 628, 624 may expand outwards to engage with opposing side walls of the anchor rail, thereby securing the multi-piece anchors to the interior side wall.

FIG. 6C includes a side isometric view of an anchor point, arranged in accordance with at least some embodiments described herein.

As shown in diagram 600C, an anchor point may include a retractable bolt with a cylindrical portion 646 and a square-shaped attachment location 638, according to at least one illustrated implementation. Such a retractable bolt may be used for the interior side walls of a vehicle or container customized for en route food preparation. The cylindrical portion 646 and the attachment location 634 may extend horizontally along a central axis between four brackets 634, 642, 644, and 648 from a proximal end to a distal end. The retractable bolt may be selectively rotated around the central axis. The attachment location 638 may be located at the distal end of the retractable bolt between the first bracket 642 and the second bracket 644. The retractable bolt may include a control handle 632 that extends perpendicularly from the cylindrical portion 646 of the retractable bolt. The control handle 632 may be located between the third bracket 648 and the fourth bracket 634. A locking weight 630 may be located at the end of the control handle 632 opposite the location at which the control handle 632 connects to the cylindrical portion 646 of the retractable bolt. The locking weight 630 may be used to orient the control handle 632 in a downward position. The distance between the first bracket 642 and the second bracket 644 may be substantially similar to the distance between the second bracket 644 and the third bracket 648. The distance between the third bracket 648 and the fourth bracket 634 may be large enough for the control handle 632 to extend therebetween.

The brackets may extend perpendicularly from the interior side walls of the vehicle when the retractable bolt is secured to the anchor tracks or rails. One or more of the brackets may include an aperture 640 through which the retractable bolt may pass. Each aperture 640 may have a cross-sectional area that is substantially circular in shape, and each aperture 640 may be aligned with the central axis of the retractable bolt. For example, the first three brackets 642, 644, 648 may include such an aperture 640. The fourth bracket 634 proximate the control handle 632 may include a cut-out 650. The cut-out may be sized and dimensioned such that the control handle 632 may pass through the cut-out when the retractable bolt is rotated about the central axis to align the control handle 632 with the cut-out 650. The control handle 632 may be sized such that the locking weight 630 may pass above the fourth bracket 634 when the retractable bolt is rotated to align the control handle 632 with the cut-out 650.

The retractable bolt may be selectively movable along the central axis between a locked position and an open position. Diagram 600C shows the retractable bolt in a locked position in which the attachment location 638 is positioned and extends between the first bracket 642 and the second bracket 644. The attachment location 638 may be sized and dimensioned to spatially align with a corresponding anchor on the food preparation and/or storage equipment. The control handle 632 may be located between the third bracket 648 and the fourth bracket 634 with the locking weight 630 oriented downward when the retractable bolt is in the locked position. In such a position, the control handle 632 will engage the side of the third bracket 648 and/or the fourth bracket 634 to thereby minimize axially movement by the retractable bolt. To transition to the unlocked position, the retractable bolt may be rotated relative to the central axis to align the control handle 632 with the cut out 650 of the fourth bracket 634. When the control handle 632 is so aligned, the retractable bolt may be moved axially in the direction of the proximal end by which the control handle 632 will pass through the cut out 650 to an exterior side of the fourth bracket 634 opposite the third bracket 648. The axially movement of the retractable bolt may cause the distal end of the retractable bolt, corresponding to the attachment location 638, to disengage from the first bracket 642 and move towards the second bracket 644. The square-shaped cross-sectional area of the attachment location 638 of the retractable bolt may be sized and dimensioned such that the attachment location 638 may pass through the apertures 640 in the first bracket 642 and/or the second bracket 644.

When the retractable bolt is in the unlocked position, the anchor rail may extend from the second bracket 644 towards and past the fourth bracket 634, thereby leaving an open area between the first bracket 642 and the second bracket 644. In this situation, food preparation and/or storage equipment may have a corresponding anchor located at an anchor point that may be positioned between the first bracket 642 and the second bracket 644 when the retractable bolt is in the unlocked position. For example, a corresponding anchor on the food preparation and/or storage equipment may include a protrusion that is sized and dimensioned to fit into the opening between the first bracket 642 and the second bracket 644. Such a protrusion may include an aperture that is sized and dimensioned to allow the attachment location 638 of the retractable bolt to pass through when the retractable bolt transitions from an open position to a closed position. Accordingly, the retractable bolt may be used to secure food preparation and/or storage equipment to the interior side walls of the vehicle.

Figure 7:
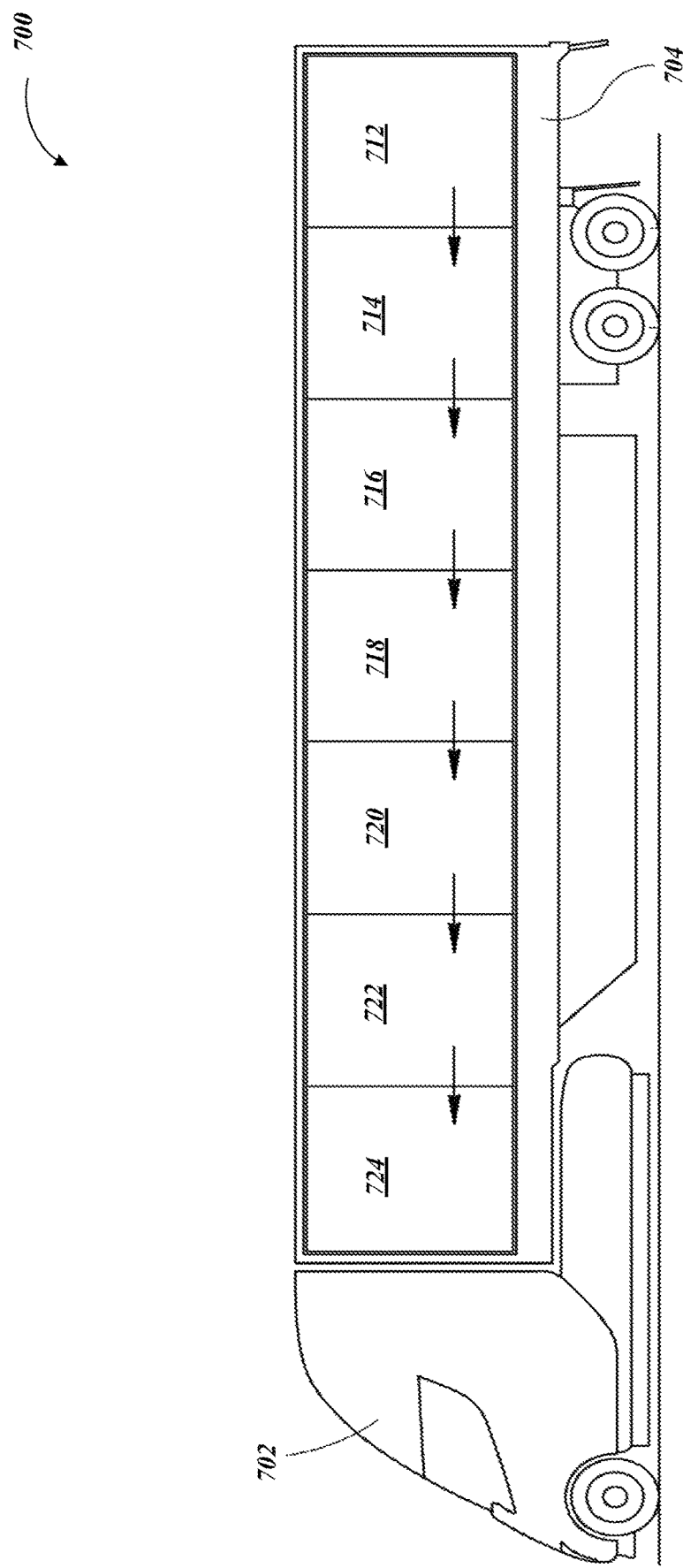
FIG. 7 includes a conceptual illustration of a semi-truck that may be used for autonomous, modular en route food product preparation.

FIG. 7 includes a conceptual illustration of a semi-truck that may be used for autonomous, modular en route food product preparation, arranged in accordance with at least some embodiments described herein.

As shown in diagram 700, a semi-truck may have a cab 702 and a trailer portion 704. The trailer portion 704 may include a container with seven distinct modules. Food preparation equipment installed in the seven distinct modules may be configured to perform different steps of a food preparation process. For example, module 712 may include tomato storage equipment. Module 714 may include tomato steaming equipment. Operational parameters for modules 712 and 714 may include predefined temperatures. Module 716 may include tomato peeling equipment to remove the skin from the tomatoes. Module 718 may include tomato cooling equipment. Module 720 may include tomato milling equipment to remove the seeds, stalk, water, and/or gelatinous portions of the tomatoes from other portions of the tomatoes through a centrifuge and/or reverse osmosis system. Module 722 may include tomato blending equipment to dice, crush, and/or puree the tomatoes. Module 724 may include finishing equipment that creates tomato sauce using the blended tomato material and other ingredients such as spices, etc. and hermetically seal the tomato sauce in one or more sealable food containers such as plastic bags.

Thus, the semi-truck and the food preparation equipment installed therein may pick up fresh, raw tomatoes at a farm and deliver finished tomato sauce to a grocery store or restaurant within the time it takes for the semi-truck to drive from the farm to its destination. The modules 712 through 724 may be configured to provide their output to the next module in a sterile and sealed manner and maintain separations between ingredients and food items while they are being processed or prepared, and final food product for human consumption once they are completed, in order to provide suitable food product for consumers with allergies to specific foods, such as peanuts or gluten. The modules may also maintain separations between ingredients and food items in order to provide vegan, vegetarian, pescatarian, kosher, or halal food, or food acceptable under any other religious or moral code(s).

In some implementations, the primary ingredient may be carbonated, for example, via a carbon dioxide system with a reservoir of carbon dioxide, conduits, valves, actuators (e.g., solenoids, electric motors), compressors, pumps, blowers, operable to introduce carbon dioxide in a gaseous form into the drink or beverage. Often, the drink or beverage will be maintained in bulk form without carbon dioxide during transit, and the carbon dioxide may be added in the delivery vehicle prior to delivery to an end consumer of the drink or beverage.

In other implementations, a delivered drink or beverage may be heated or pasteurized (e.g., flash-pasteurized) via one or more heaters, pressure vessels, water jets, of flash pasteurization systems en route prior to delivery to an end consumer of the drink or beverage. Similarly, frozen or chilled drinks or beverages such as smoothies may be prepared based on timing parameters associated with expected arrival at the final delivery destination. For example, a smoothie may be prepared early on the route and stored in a chilled storage appliance. Another type of smoothie, which may coagulate if not consumed soon as production, may be prepared later on the route and chilled storage time minimized based on the expected arrival time.

Figure 8:
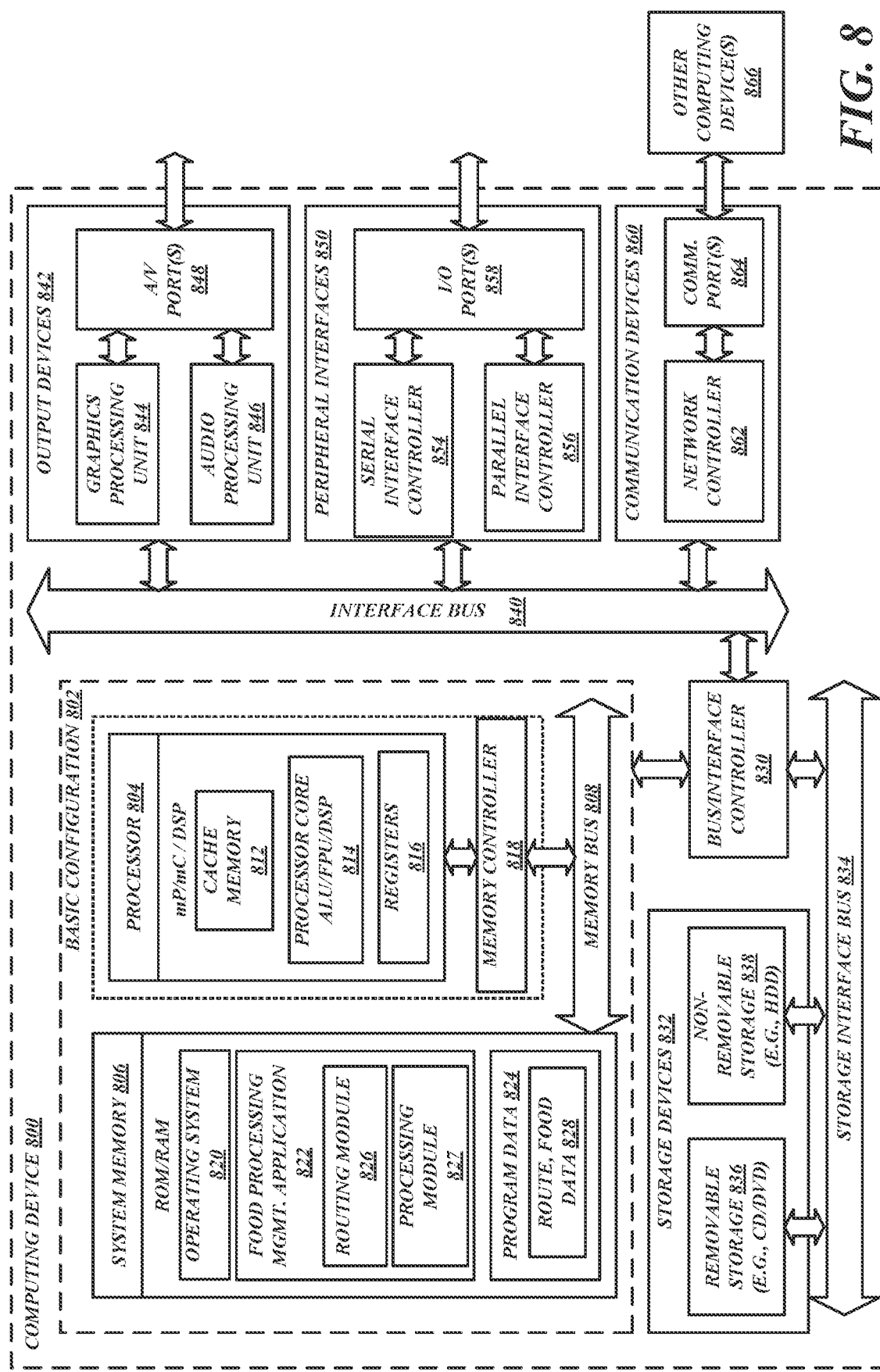
FIG. 8 illustrates a computing device, which may be used to manage an example en route food product preparation system; at least some of which are arranged in accordance with at least some embodiments described herein.

FIG. 8 illustrates a computing device, which may be used to manage an example en route food product preparation system, arranged in accordance with at least some embodiments described herein.

In an example basic configuration 802, the computing device 800 may include one or more processors 804 and a system memory 806. A memory bus 808 may be used to communicate between the processor 804 and the system memory 806. The basic configuration 802 is illustrated in FIG. 8 by those components within the inner dashed line.

Depending on the desired configuration, the processor 804 may be of any type, including but not limited to a microprocessor (µP), a microcontroller (µC), a digital signal processor (DSP), or any combination thereof. The processor 804 may include one or more levels of caching, such as a cache memory 812, a processor core 814, and registers 816. The example processor core 814 may include an arithmetic logic unit (ALU), a floating point unit (FPU), a digital signal processing core (DSP core), or any combination thereof. An example memory controller 818 may also be used with the processor 804, or in some implementations, the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a food processing management application 822, a routing module 826, and a processing module 827. The food processing management application 822, in conjunction with the routing module 826, may direct a vehicle equipped to prepare food items to a delivery destination. The routing module 826 may provide instructions to an on-board controller to direct the vehicle to the final delivery destination along with one or more intermediary waypoints, selected or available routes, and provide additional information such as traffic/road/weather conditions that may be used to adjust food processing parameters such as timing. The processing module 827 may determine and adjust steps of the food item preparation process and provide instructions to the on-board controller to manage robotic devices in preparing the processing the food items. The program data 824 may include route and food data 828, among other data, as described herein. Route data may include destination, available or recommended routes, traffic information, travel time information, etc. Food data may include information associated with food items (e.g., raw materials), desired food products, preparation steps, timings, etc.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (e.g., one or more output devices 842, one or more peripheral interfaces 850, and one or more communication devices 860) to the basic configuration 802 via the bus/interface controller 830. Some of the example output devices 842 include a graphics processing unit 844 and an audio processing unit 846, which may be configured to communicate to various external devices such as a display or speakers via one or more A/V ports 848. One or more example peripheral interfaces 850 may include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 860 includes a network controller 862, which may be arranged to facilitate communications with one or more other computing devices 866 over a network communication link via one or more communication ports 864. The one or more other computing devices 866 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include non-transitory storage media.

The computing device 800 may be implemented as a part of a specialized server, mainframe, or similar computer that includes any of the above functions. The computing device 800 may also be implemented as a personal computer including both laptop computer and non-laptop computer configurations.

While delivery trucks, containers, and modular en route food preparation systems are discussed herein as illustrative examples, some embodiments may be directed to methods such as manufacturing or using discussed vehicles and systems or en route food preparation through the discussed vehicles and systems. Example methods may include one or more operations, functions, or actions some of which may be performed by a computing device such as the computing device 800 in FIG. 8 and/or other general purpose and specialized devices communicatively coupled to the computing device 800. Such operations, functions, or actions may be combined, eliminated, modified, and/or supplemented with other operations, functions or actions, and need not necessarily be performed in a specific sequence.

According to some examples, a modular system for en route food product preparation is described. The method may include a container configured to provide a sterile environment for preparation of food items en route to a delivery destination; one or more intake ports on the container configured to receive the food items and supplies; one or more delivery ports on the container configured to provide prepared food product; one or more re-configurable anchor systems in the container configured to anchor one or more food preparation equipment; and one or more re-configurable supply ports in the container configured to supply the one or more food preparation equipment. The modular system may also include an on-board controller configured to determine travel information, food items information, and food product information associated with the food product to be prepared and delivered; determine one or more steps and a timing for a process to prepare the food product based on the travel information, the food items information, and the food product information; and control robotic devices of the one or more food preparation equipment to autonomously execute the process such that the food product is prepared when the modular system reaches the delivery destination.

According to other examples, a size or a position of the one or more intake ports may be re-configurable based on a type of the food items and supplies to be received. A size or a position of the one or more delivery ports may be re-configurable based on a type of the food product to be delivered. The one or more re-configurable anchor systems may include a plurality of unitary anchor points or a plurality of separated anchor points along one or more interior walls of the container. The one or more re-configurable anchor systems may include a plurality of unitary anchor points or a plurality of separated anchor points along one or more frames or rails within the container. The container may be compartmentalized to enable distinct environmental conditions for the one or more food preparation equipment. Compartments of the container may be configured to feed each other with outputs of the one or more food preparation equipment in each compartment.

According to further examples, the travel information may include one or more delivery destination locations, one or more potential routes between the delivery destinations, road condition information for the potential routes, traffic condition information for the potential routes, or weather condition information for the potential routes; the food items information may include one or more of quantity information, quality information, or type information associated with ingredients for the food products to be prepared; and the food product information may include one or more of quantity information, quality information, type information, or packaging information associated with the food product to be prepared. The on-board controller may be further configured to determine an estimated time to reach the delivery destination; and determine one or more of an initiation time, a duration, or a termination time for each step for the process to prepare the food product.

According to yet other examples, the on-board controller may be further configured to determine updated travel information while en route; re-determine the one or more steps and the timing for the process to prepare the food product based on the updated travel information; and adjust a currently executed step and one or more yet-to-be executed steps of the process to prepare the food product. The on-board controller may also pause a step of the process in response to the updated travel information; and resume the step after a time period determined based on an updated expected arrival time at the delivery destination. The on-board controller may further adjust one or more of an operational parameter of a step of the process or a travel parameter associated with the modular system in response to the updated travel information; match one or more of an operational parameter of a step of the process to a portion of a travel route based on the travel information; or adjust a travel parameter associated with the modular system in response to the execution of the one or more steps of the process. The modular system may also include a storage area for one or more airborne or ground-based delivery drones, where the on-board controller may be further configured to control operations of the one or more airborne or ground-based delivery drones to deliver the prepared food product to a plurality of destination addresses once the container has reached the delivery destination.

According to some examples, a vehicle to prepare food items en route is described. The vehicle may include a container configured to provide a re-configurable, sterile environment for one or more food preparation and storage equipment with robotic devices to autonomously prepare food items en route to a delivery destination; a communication system configured to enable wired or wireless communications with a remote controller system; and an on-board controller communicatively coupled to the communication system and robotic devices on each of the one or more food preparation and storage equipment. The on-board controller may be configured to receive instructions from the remote controller system associated with one or more steps and a timing for a process to prepare the food items based on travel information, food items information, and food product information collected by the remote controller system for the vehicle; and control operations of the robotic devices to autonomously execute the process en route based on the received instructions.

According to other examples, the container may include one or more intake ports on the container configured to receive the food items and supplies, where a size or a position of the one or more intake ports is re-configurable based on a type of the food items and supplies to be received; one or more delivery ports on the container configured to provide a prepared food product, where a size or a position of the one or more delivery ports is re-configurable based on a type of the food product to be delivered; one or more re-configurable anchor systems in the container configured to anchor one or more food preparation and storage equipment, where the one or more re-configurable anchor systems comprise a plurality of unitary anchor points or a plurality of separated anchor points along one or more interior walls, frames, or rails within the container; and one or more re-configurable supply ports in the container configured to supply the one or more food preparation and storage equipment.

According to further examples, the container may be compartmentalized to enable distinct environmental conditions for the one or more food preparation and storage equipment and compartments of the container may be configured to feed each other with outputs of the one or more food preparation and storage equipment in each compartment. The travel information may include one or more delivery destination locations, one or more potential routes between the delivery destinations, road condition information for the potential routes, traffic condition information for the potential routes, or weather condition information for the potential routes; the food items information may include one or more of quantity information, quality information, or type information associated with ingredients for the food products to be prepared; and the food product information may include one or more of quantity information, quality information, type information, or packaging information associated with the food product to be prepared.

According to yet other examples, the received instructions may include one or more of an initiation time, a duration, or a termination time for each step for the process to prepare a food product. The vehicle may further include a display device configured to cover a substantial area of one or more exterior walls of a cargo portion of the vehicle that includes the container; and display one or more of an advertising, a brand information, or captured images of food preparation inside the container. The display device may be further configured to modify displayed advertising or brand information based on one or more of receiving an instruction, a time of day, a location of the vehicle, or a type of a food product being delivered. The one or more food preparation and storage equipment may be configured to perform one or more of washing, peeling, seeding, destemming, cutting, dicing, slicing, crushing, pureeing, blending, steaming, cooking, heating, broiling, boiling, simmering, frying, cooling, freezing, pressing, crushing, grinding, pasteurizing, fermenting, sterilizing, or packaging of the food items or the food products, or a combination thereof. The one or more food preparation and storage equipment may be arranged in one or more sealable container modules configured to feed each other. The vehicle may be a truck, a railway car, or a watercraft.

According to some examples, a food delivery truck to prepare food items en route is described. The food delivery truck may include a cab portion to control travel operations; a cargo portion configured to provide a re-configurable, sterile environment for one or more food preparation and storage equipment with robotic devices to autonomously prepare food items en route to a delivery destination; a communication system configured to enable wireless communications with one or more remote devices; and an on-board controller communicatively coupled to the communication system and robotic devices on each of the one or more food preparation and storage equipment. The on-board controller may be configured to determine travel information, food items information, and food product information associated with a food product to be prepared and delivered; determine one or more steps and a timing for a process to prepare the food product based on the travel information, the food items information, and the food product information; and control robotic devices of the one or more food preparation and storage equipment to autonomously execute the process such that the food product is prepared when the food delivery truck reaches the delivery destination.

According to other examples, a size or a position of the one or more intake ports may be re-configurable based on a type of the food items and supplies to be received; a size or a position of the one or more delivery ports may be re-configurable based on a type of the food product to be delivered; and the one or more re-configurable anchor systems may include a plurality of unitary anchor points or a plurality of separated anchor points along one or more interior walls, frames, or rails within the cargo portion. The cargo portion may be compartmentalized to enable distinct environmental conditions for the one or more food preparation and storage equipment; and compartments of the cargo portion may be configured to feed each other with outputs of the one or more food preparation and storage equipment in each compartment.

According to further examples, the on-board controller may be further configured to determine an estimated time to reach the delivery destination; and determine one or more of an initiation time, a duration, or a termination time for each step for the process to prepare the food product. The on-board controller may be further configured to determine updated travel information while en route; re-determine the one or more steps and the timing for the process to prepare the food product based on the updated travel information; and adjust a currently executed step and one or more yet-to-be executed steps of the process to prepare the food product. The food delivery truck may further include a delivery window on a side wall of the cargo portion to deliver the food product once the food delivery truck reaches the delivery destination; and one or more display devices covering a substantial area of one or more exterior walls of a cargo portion. The one or more display devices may be configured to display one or more of an advertising, a brand information, or captured images of food preparation inside the container; and modify displayed advertising or brand information based on one or more of receiving an instruction, a time of day, a location of the vehicle, or a type of the food product being delivered.

Certain specific details are set forth herein in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices such as ovens, skillets, and other similar devices, closed-loop controllers used to control cooking conditions, food preparation techniques, wired and wireless communications protocols, wired and wireless transceivers, radios, communications ports, geolocation, and optimized route mapping algorithms have not been shown or described in detail to avoid unnecessarily obscuring descriptions of the embodiments. In other instances, certain structures associated with conveyors, robots, and/or vehicles have not been shown or described in detail to avoid unnecessarily obscuring descriptions of the embodiments.

As used herein the term "travel information" refers to delivery destination locations, one or more potential routes between the delivery destinations, road condition information (road curvatures, road tilt, expected vehicle tilt, construction, road roughness, etc.) for the potential routes, traffic condition information for the potential routes, weather condition information (temperature, humidity, altitude, winds, wave size, etc.) for the potential routes, licensing information, and any other conditions that may affect travel of the vehicle equipped to prepare food items en route.

As used herein the terms "food item" and "food product" refer to any item or product intended for human consumption. A "food product" is generally understood to be made by preparing "food items", that is, ingredients, raw or cooked materials, etc., and may also include interim ingredients (e.g., prepared ingredients that may be used to prepare a final food product, e.g., pizza sauce). Although illustrated and described in some embodiments herein in the context of pizza to provide a readily comprehensible and easily understood description of one illustrative embodiment, one of ordinary skill in the culinary arts and food preparation will readily appreciate the broad applicability of the systems, methods, and apparatuses described herein across any number of prepared food items or products, including cooked and uncooked food items or products, and ingredients or components of food items and products.

As used herein the terms "robot" or "robotic" refer to any device, system, or combination of systems and devices that includes at least one appendage, typically with an end of arm tool or end effector, where the at least one appendage is selectively moveable to perform work or an operation useful in the preparation a food item or packaging of a food item or food product. The robot may be autonomously controlled, for instance based at least in part on information from one or more sensors (e.g., optical sensors used with machine-vision algorithms, position encoders, temperature sensors, moisture or humidity sensors). Alternatively, one or more robots can be remotely controlled by a human operator. Alternatively, one or more robots can be partially remotely controlled by a human operator and partially autonomously controlled.

As used herein, the term "food preparation equipment" refers to any equipment or appliance used prepare "food items" including "cooking", but not limited to. For example, "food preparation equipment" may be used to slice, dice, blend, wash, or otherwise process the "food items". For example, food preparation equipment refers to any device, system, or combination of systems and devices useful in the preparation of a food product. While such preparation may include ingredient distribution devices, choppers, peeler, cooking units for the heating of food products during preparation, rolling units, mixers, blenders, etc. and such preparation may also include the partial or complete cooling of one or more food products. Further, the food preparation equipment may be able to control more than temperature. For example, some food preparation equipment may control pressure or humidity. Further, some food preparation equipment may control airflow therein, thus able to operate in a convective mode if desired, for instance to decrease preparation time.

As used herein, food preparation refers to any preparation or process of food items to prepare a food product from that food item and may include any one or more of washing, destemming, peeling, mixing, chopping, blending, grinding, cooking, cooling, and packaging, and the time, temperature speed or any other control or environmental factor of that processing step.

As used herein the term "vehicle" refers to any car, truck, van, train, watercraft, or other vehicle useful in preparing a food item during a delivery process.

There are various vehicles by which processes and/or systems and/or other technologies described herein may be affected (e.g., hardware, software, and/or firmware), and the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

It is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A modular system for food product preparation, the method system comprising:
    a container configured to provide an environment for preparation of food items;
    one or more intake ports on the container configured to receive the food items and supplies;
    one or more delivery ports on the container configured to provide prepared food product;
    one or more re-configurable anchor systems in the container configured to anchor one or more food preparation equipment;
    one or more re-configurable supply ports in the container configured to supply the one or more food preparation equipment; and
    an on-board controller configured to:
        determine travel information of a vehicle, food items information, and food product information associated with the food product to be prepared and delivered;
        determine one or more steps and a timing for a process to prepare the food product based on the travel information, the food items information, and the food product information; and
        control robotic devices of the one or more food preparation equipment to autonomously execute the process such that the food product is prepared when the vehicle reaches the delivery destination.

2. The modular system of claim 1, wherein a size or a position of the one or more intake ports is re-configurable based on a type of the food items and supplies to be received.

3. The modular system of claim 1, wherein a size or a position of the one or more delivery ports is re-configurable based on a type of the food product to be delivered.

4. The modular system of claim 1, wherein the one or more re-configurable anchor systems comprise a plurality of unitary anchor points or a plurality of separated anchor points along one or more interior walls of the container.

5. The modular system of claim 1, wherein the one or more re-configurable anchor systems comprise a plurality of unitary anchor points or a plurality of separated anchor points along one or more frames or rails within the container.

6. The modular system of claim 1, wherein the container is compartmentalized to enable distinct environmental conditions for the one or more food preparation equipment.

7. The modular system of claim 1, wherein compartments of the container are configured to feed each other with outputs of the one or more food preparation equipment in each compartment.

8. The modular system of claim 1, wherein
    the container is on the vehicle;
    the travel information includes one or more delivery destination locations, one or more potential routes between the delivery destinations, road condition information for the potential routes, traffic condition information for the potential routes, or weather condition information for the potential routes;
    the food items information includes one or more of quantity information, quality information, or type information associated with ingredients for the food products to be prepared; and
    the food product information includes one or more of quantity information, quality information, type information, or packaging information associated with the food product to be prepared.

9. The modular system of claim 8, wherein the on-board controller is further configured to:
    determine an estimated time to reach the delivery destination; and
    determine one or more of an initiation time, a duration, or a termination time for each step for the process to prepare the food product.

10. The modular system of claim 1, wherein the on-board controller is further configured to:
    determine updated travel information while the vehicle is en route;
    re-determine the one or more steps and the timing for the process to prepare the food product based on the updated travel information; and
    adjust a currently executed step and one or more yet-to-be executed steps of the process to prepare the food product.

11. The modular system of claim 10, wherein the on-board controller is further configured to:
    pause a step of the process in response to the updated travel information; and
    resume the step after a time period determined based on an updated expected arrival time at the delivery destination.

12. The modular system of claim 1, wherein the on-board controller is further configured to:
    adjust one or more of an operational parameter of a step of the process or a travel parameter associated with the vehicle in response to the updated travel information.

13. The modular system of claim 1, wherein the on-board controller is further configured to:

match one or more of an operational parameter of a step of the process to a portion of a travel route based on the travel information.

14. The modular system of claim 1, wherein the on-board controller is further configured to:
   adjust a travel parameter associated with the vehicle in response to the execution of the one or more steps of the process.

15. The modular system of claim 1, further comprising:
   a storage area for one or more airborne or ground-based delivery drones, wherein the on-board controller is further configured to control operations of the one or more airborne or ground-based delivery drones to deliver the prepared food product.

16. A vehicle to prepare food items en route, the vehicle comprising:
   a container configured to provide a re-configurable, sterile environment for one or more food preparation and storage equipment with robotic devices to autonomously prepare food items en route to a delivery destination;
   a communication system configured to enable wired or wireless communications with a remote controller system; and
   an on-board controller communicatively coupled to the communication system and robotic devices on each of the one or more food preparation and storage equipment, wherein the on-board controller is configured to:
      receive instructions from the remote controller system associated with one or more steps and a timing for a process to prepare the food items based on travel information, food items information, and food product information collected by the remote controller system for the vehicle; and
      control operations of the robotic devices to autonomously execute the process en route based on the received instructions.

17. A food delivery truck to prepare food items en route, the food delivery truck comprising:
   a cab portion to control travel operations;
   a cargo portion configured to provide a re-configurable, sterile environment for one or more food preparation and storage equipment with robotic devices to autonomously prepare food items en route to a delivery destination;
   a communication system configured to enable wireless communications with one or more remote devices; and
   an on-board controller communicatively coupled to the communication system and robotic devices on each of the one or more food preparation and storage equipment, wherein the on-board controller is configured to:
      determine travel information, food items information, and food product information associated with a food product to be prepared and delivered;
      determine one or more steps and a timing for a process to prepare the food product based on the travel information, the food items information, and the food product information; and
      control robotic devices of the one or more food preparation and storage equipment to autonomously execute the process such that the food product is prepared when the food delivery truck reaches the delivery destination.

18. The modular system of claim 1, wherein
   the container is at the delivery destination;
   the travel information includes the current location of one or more vehicles, one or more potential routes between the current location vehicle of one or more vehicles and the delivery destination, road condition information for the potential routes, traffic condition information for the potential routes, or weather condition information for the potential routes;
   the food items information includes one or more of quantity information, quality information, or type information associated with ingredients for the food products to be prepared; and
   the food product information includes one or more of quantity information, quality information, type information, or packaging information associated with the food product to be prepared.

19. The modular system of claim 1, wherein
   the one or more delivery ports are accessible by the vehicle.

20. The modular system of claim 1, wherein the controller is further configured to:
   control the robotic devices of the one or more food preparation equipment to place the prepared food product in one of the one or more delivery ports.

* * * * *